US006085142A

United States Patent [19]

Di Leo et al.

[11] Patent Number: 6,085,142

[45] Date of Patent: Jul. 4, 2000

[54] CALIBRATION METHOD FOR A FUEL INJECTION SYSTEM

[75] Inventors: Luigi Di Leo, Venaria Reale; Mario Palazzetti; Cesare Ponti, both of Avigliana, all of Italy

[73] Assignee: C.R.F. S.C.P.A., Orbassano, Italy

[21] Appl. No.: 09/214,930

[22] PCT Filed: Jul. 15, 1997

[86] PCT No.: PCT/EP97/03776

§ 371 Date: Mar. 15, 1999

§ 102(e) Date: Mar. 15, 1999

[87] PCT Pub. No.: WO98/03783

PCT Pub. Date: Jan. 29, 1998

[30] Foreign Application Priority Data

Jul. 17, 1996 [IT] Italy .................................. TO96A0623

[51] Int. Cl.[7] .......................... F02M 65/00; G01M 19/00

[52] U.S. Cl. .......................................... 701/104; 73/119 A

[58] Field of Search .................................... 701/103, 104, 701/105, 114; 73/119 A; 123/357, 486, 494

[56] References Cited

U.S. PATENT DOCUMENTS

| | | | |
|---|---|---|---|
| 4,200,064 | 4/1980 | Engele | 123/674 |
| 4,667,634 | 5/1987 | Matsumura et al. | 123/357 |
| 4,798,084 | 1/1989 | Takahashi et al. | 73/199 A |
| 4,840,059 | 6/1989 | Okada et al. | 73/119 A |
| 4,986,117 | 1/1991 | Yoshizu et al. | 73/119 A |
| 4,989,150 | 1/1991 | Tazawa | 73/119 A |
| 5,157,967 | 10/1992 | Wieczorek | 73/119 A |
| 5,241,858 | 9/1993 | Wieczorek et al. | 73/119 A |
| 5,445,019 | 8/1995 | Glidewell et al. | 73/119 A |
| 5,575,264 | 11/1996 | Barron | 73/119 A |
| 5,641,891 | 6/1997 | Frankl et al. | 73/119 A |
| 5,771,861 | 6/1998 | Musser et al. | 701/104 |

FOREIGN PATENT DOCUMENTS

| | | |
|---|---|---|
| 0416270A1 | 3/1991 | European Pat. Off. . |
| 3943207A | 7/1990 | Germany . |
| 4334720A | 4/1995 | Germany . |
| 61055347 | 7/1986 | Japan . |
| WO89/06310 | 7/1989 | WIPO . |

*Primary Examiner*—Willis R. Wolfe
*Attorney, Agent, or Firm*—Sughrue, Mion, Zinn, Macpeak & Seas, PLLC

[57] ABSTRACT

A method of calibrating the injectors of an injection system for an internal combustion engine which can compensate for the different flow rates of the injectors fitted in the engine, which are due to the production tolerances of the injectors, in order to re-match the injectors with consequent balancing of the combustion and overall improvement in the performance of the engine. The method is based on the determination of the flow rates of the injectors both with low admissions (idling) and with high admissions (acceleration) by measurement of the torque pulses supplied by each cylinder of the engine with the use of a dynamic torque measurement method.

13 Claims, 18 Drawing Sheets

CALIBRATION METHOD FOR A FUEL INJECTION SYSTEM

Figure 1:
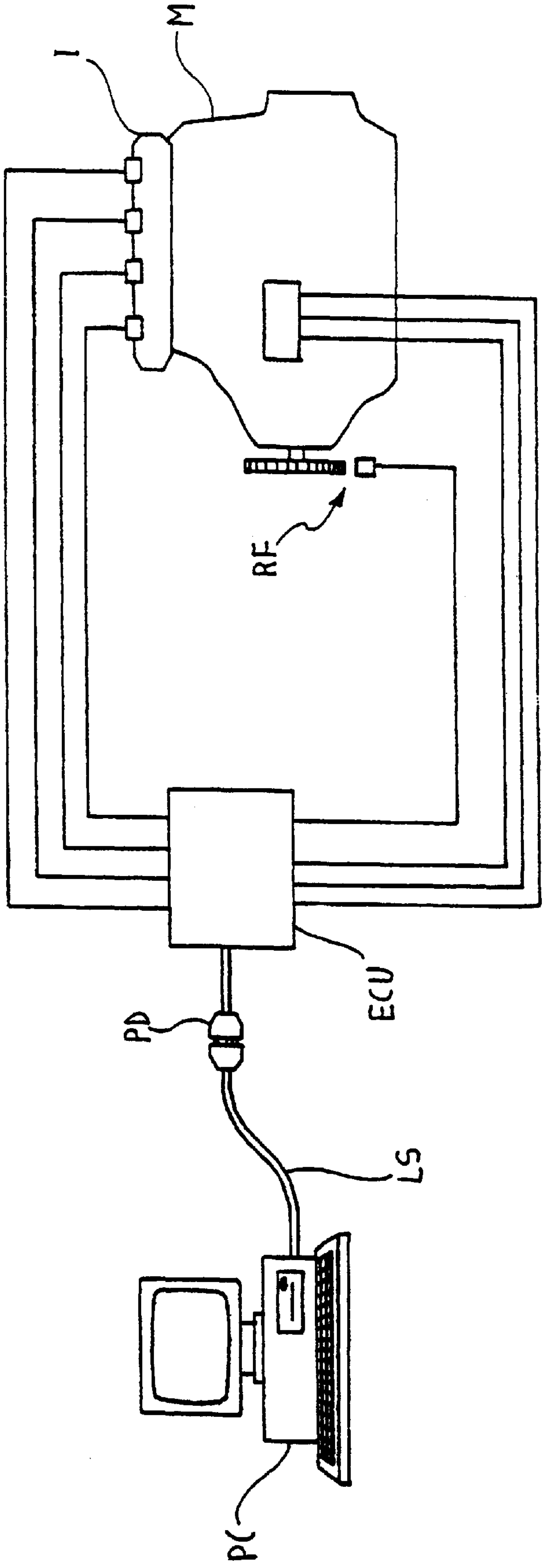

The present invention relates in general to a calibration method for a fuel-injection system provided with a plurality of injectors for an internal-combustion engine, implemented by means of an electronic control unit dedicated to the management of the engine. More specifically, the present invention relates to a method according to the preamble of claim 1, which eliminates problems due to the production tolerances of the injectors.

The present invention has been developed in particular for petrol-engine injectors but its use may possibly also be extended to engines of other types, for example, to Diesel engines.

It is known that practically all petrol internal-combustion engines for motor-vehicles are now provided with electronic injection systems and catalytic devices for reducing the pollutants present in the exhaust gases in order to conform to current legal norms relating to exhaust-gas emissions and, at the same time, to ensure optimal performance. Engines of this type thus have injection systems comprising one or more injectors for admitting fuel to the intake ducts of the engine.

In order to achieve the desired objectives with regard to exhaust-gas emissions and engine performance it is of primary importance to be able to control precisely the amount of fuel injected into each cylinder of the engine. For this reason, so-called multi-point injection systems with timed sequential injection are becoming ever more widespread. In practice, these are injection systems comprising one injector for each cylinder of the engine, the electronic control unit controlling each injector individually.

However, a technical problem arises owing to the characteristics of the injectors currently available on the market. In fact, it is known that the injectors produced have a considerable flow-rate tolerance. Flow-rate means the amount of fuel passing through the injector per unit of time at a given fuel pressure.

Since all of the injectors of an internal-combustion engine are supplied with fuel at the same pressure (which is also substantially constant), the amount of fuel injected by each injector per unit of time depends on the flow-rate characteristic of the individual injector.

This flow-rate characteristic of each individual injector may vary by plus or minus 20% from the nominal flow-rate provided for in the design specification of an injector of a given type, owing to the method by which the injectors are produced.

Thus, although the electronic control unit controls precisely the open time of each individual injector, the amount of fuel injected by each individual injector cannot be controlled precisely because of the differences in the flow-rate characteristics which may be encountered amongst injectors fitted in the same injection system.

This has necessitated the introduction of control and checking procedures in order to produce injectors having lower flow-rate tolerances. The production of injectors having a flow-rate tolerance of plus or minus 4% has thus been achieved, but at the price of a large increase in production costs.

However, even a tolerance of plus or minus 4% is quite high for use in modern electronic-injection systems.

The trend towards increasingly strict norms relating to exhaust-gas emissions and a requirement for the integrity of the system for reducing them to be maintained for up to 100,000 miles (about 160,000 km), give rise to a need to identify techniques more suitable for achieving these objectives.

For this purpose, for example, the American norm CARB (California Air Resources Board)—OBD II (On Board Diagnostics) which is shortly also to be applied in Europe requires, amongst other things, detection of misfires in the vehicle during its normal use.

The identification of this anomaly must be indicated by the switching-on of an indicator light which is disposed on the vehicle dashboard and which, once switched on, can be switched off only by the intervention of a technical service centre authorized for the maintenance of the vehicle. This measure protects the catalyst or catalytic converter which would be damaged rapidly by the formation, due to misfires, of cold fronts which can destroy its active parts.

The application of the OBD II norm in this form could cause disagreeable anxiety to the user who would be forced to go back to the technical service centre each time the warning light operated.

It is therefore necessary to integrate this function with control systems which are able not only to protect the catalyst but also to maintain the engine in conditions such as to reduce or eliminate the generation of misfires.

A method of calibrating an injection system according to the preamble of claim 1 is disclosed in EP-A-0 416 270. This method allows to lessen the effects of the flow-rate tolerances of the injectors. However it does not take into account the effects of compression imbalances of the cylinders due for example to leaktightness of the valves or of the piston rings.

The object of the present invention is to provide an improved calibration method of the above-specified kind and a novel fuel injection system.

According to the present invention, this object is achieved by means of a calibration method having the features defined in claim 1 and an injection system according to claim 13.

Figure 2:
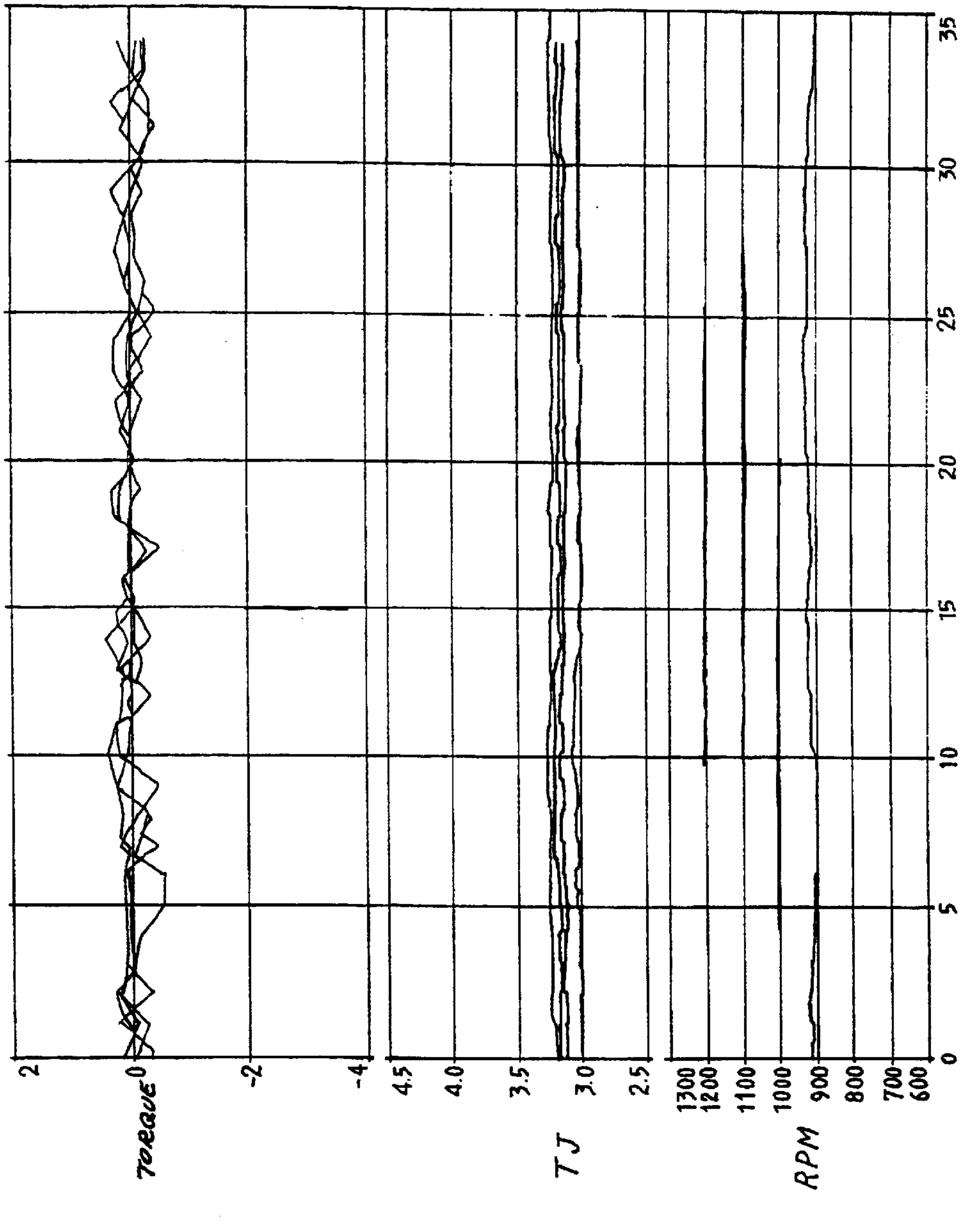
Figure 3:
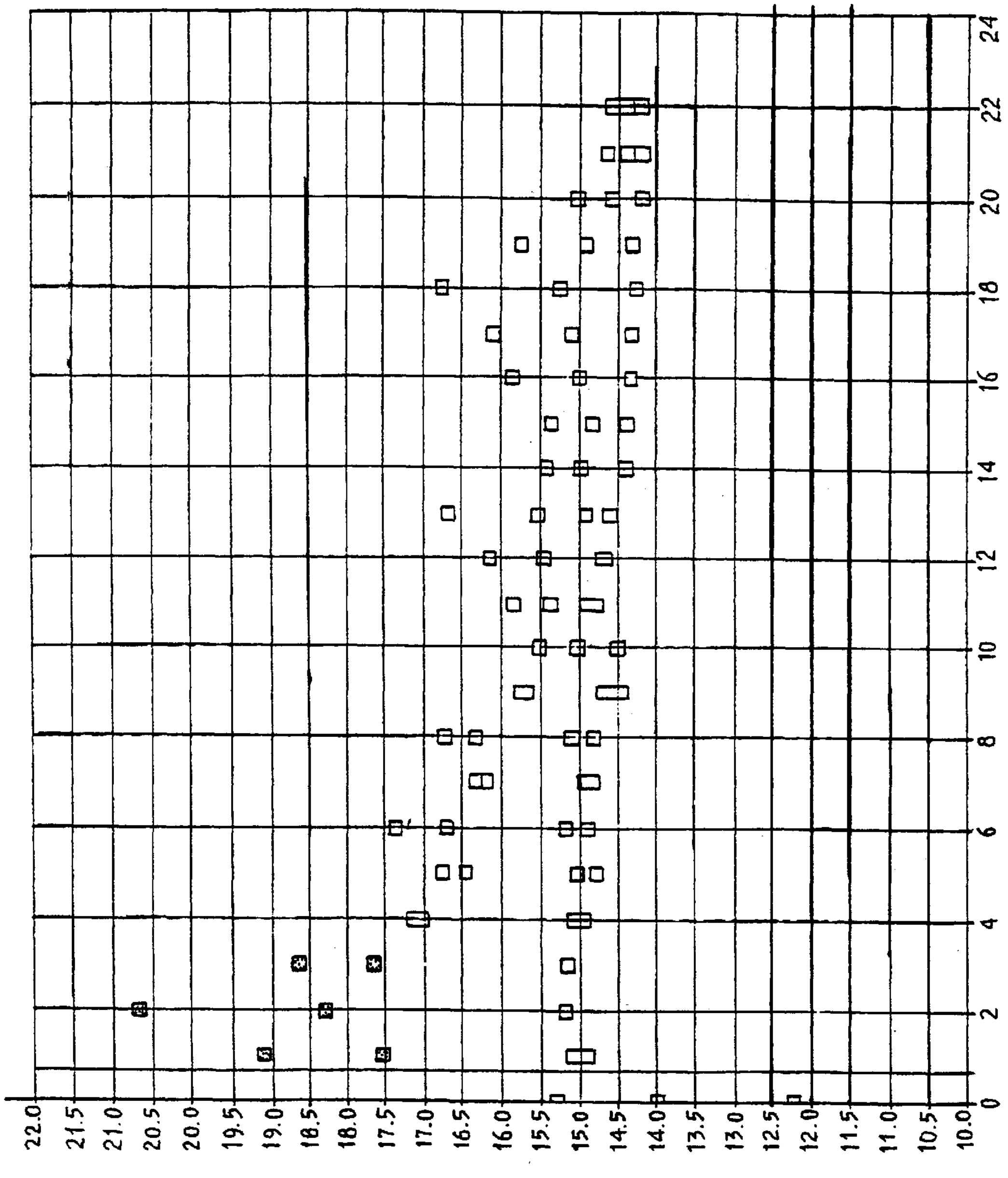
Figure 4:
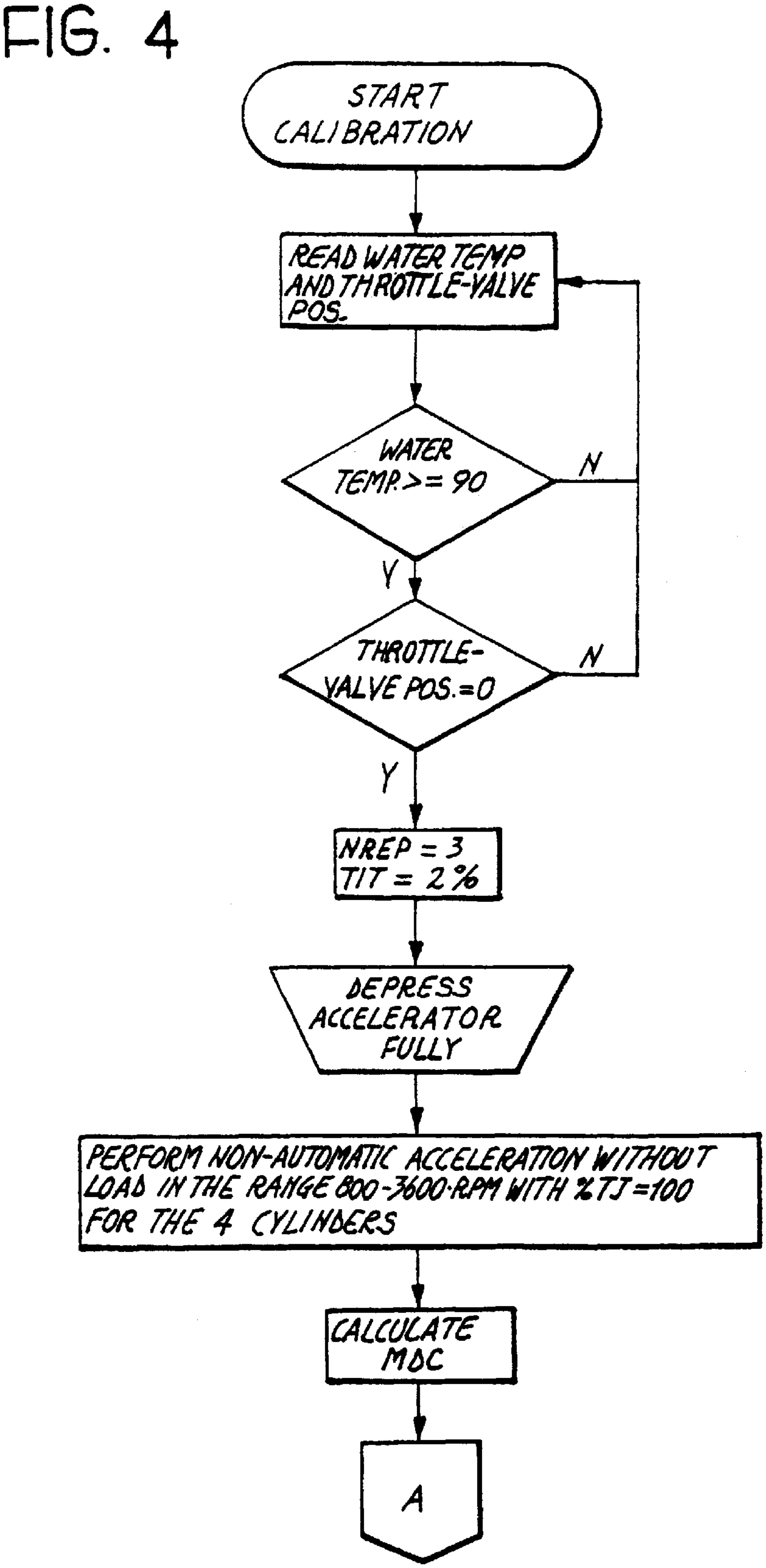
Figure 5:
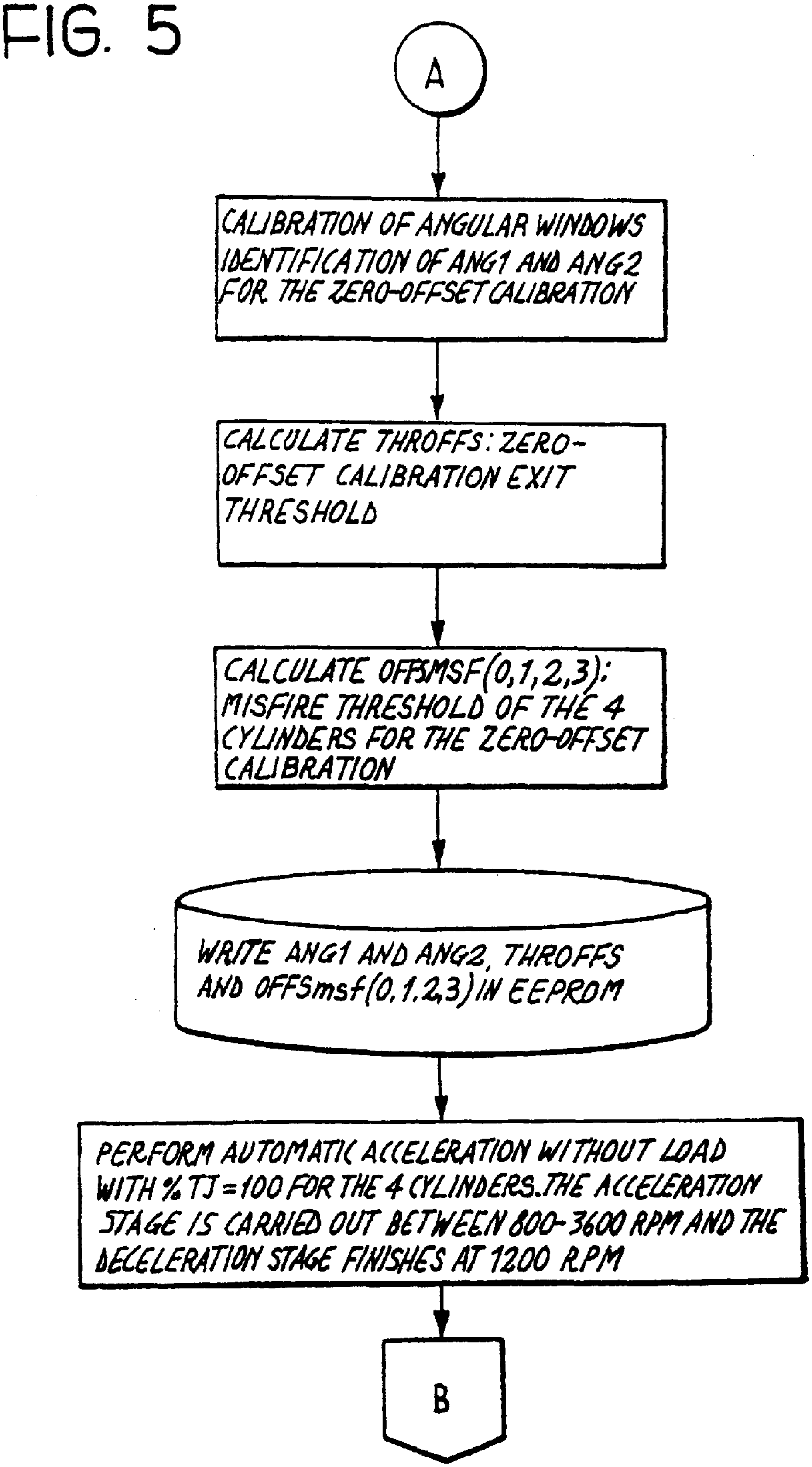
Figure 6:
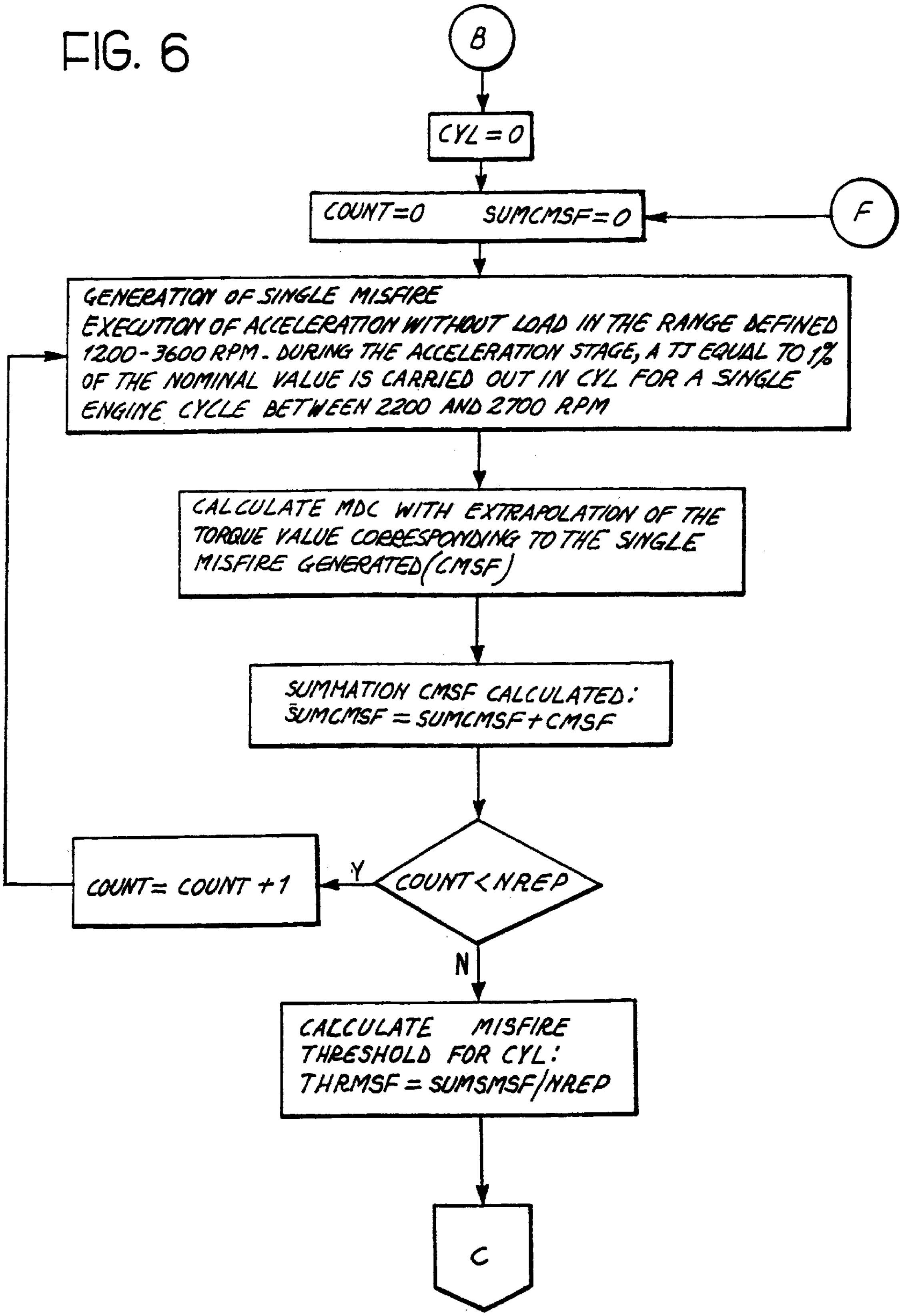
Figure 7:
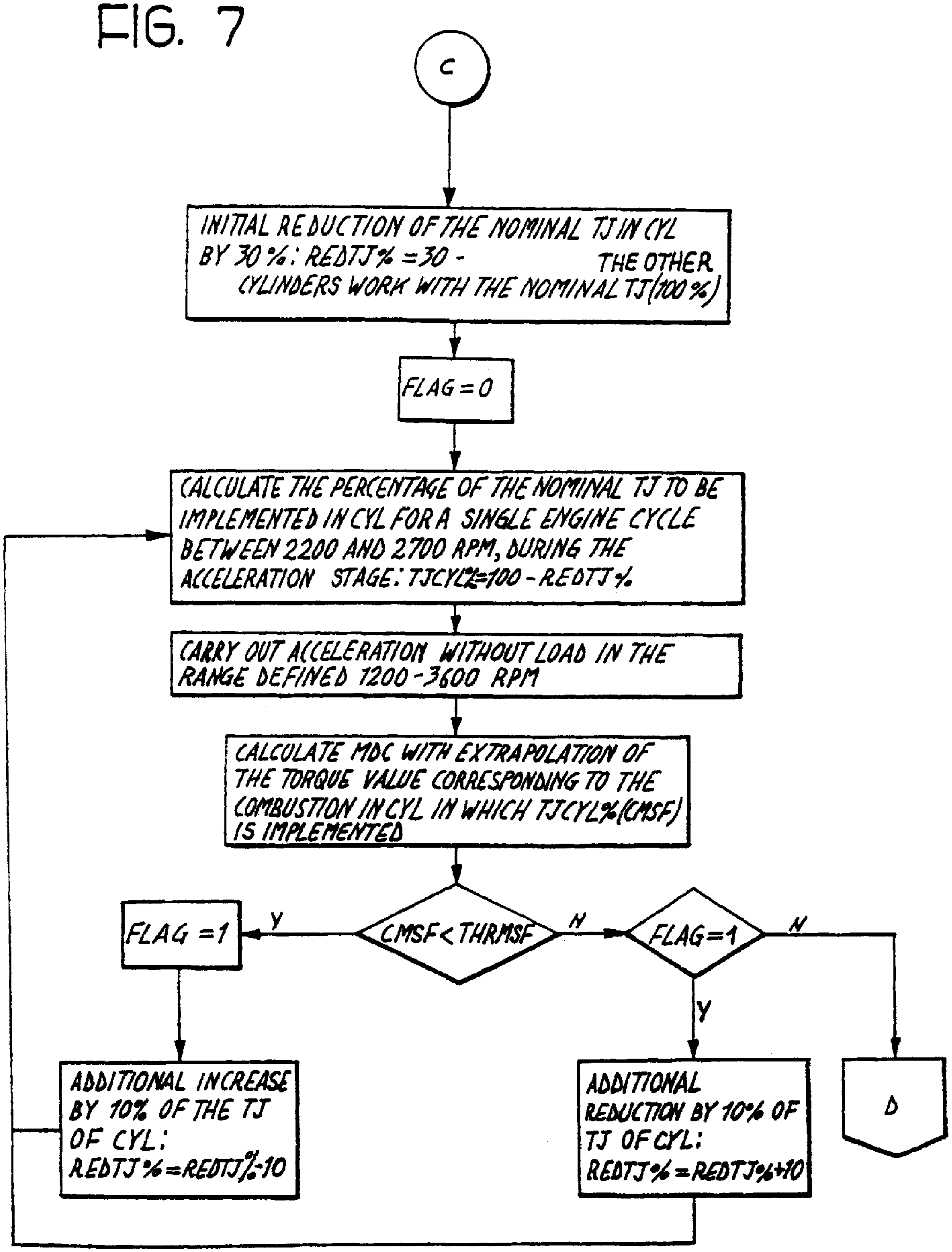
Figure 8:
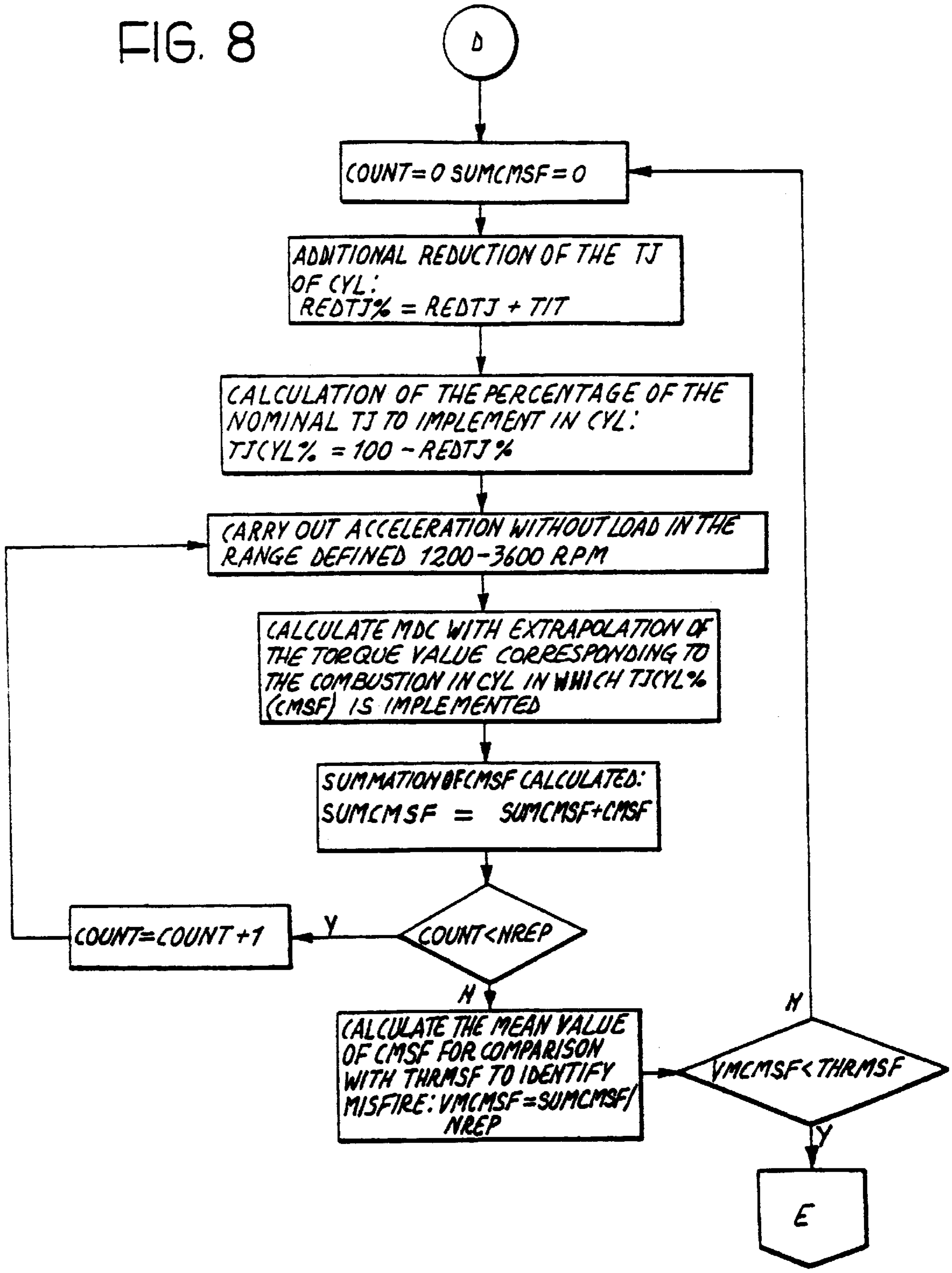
Figure 9:
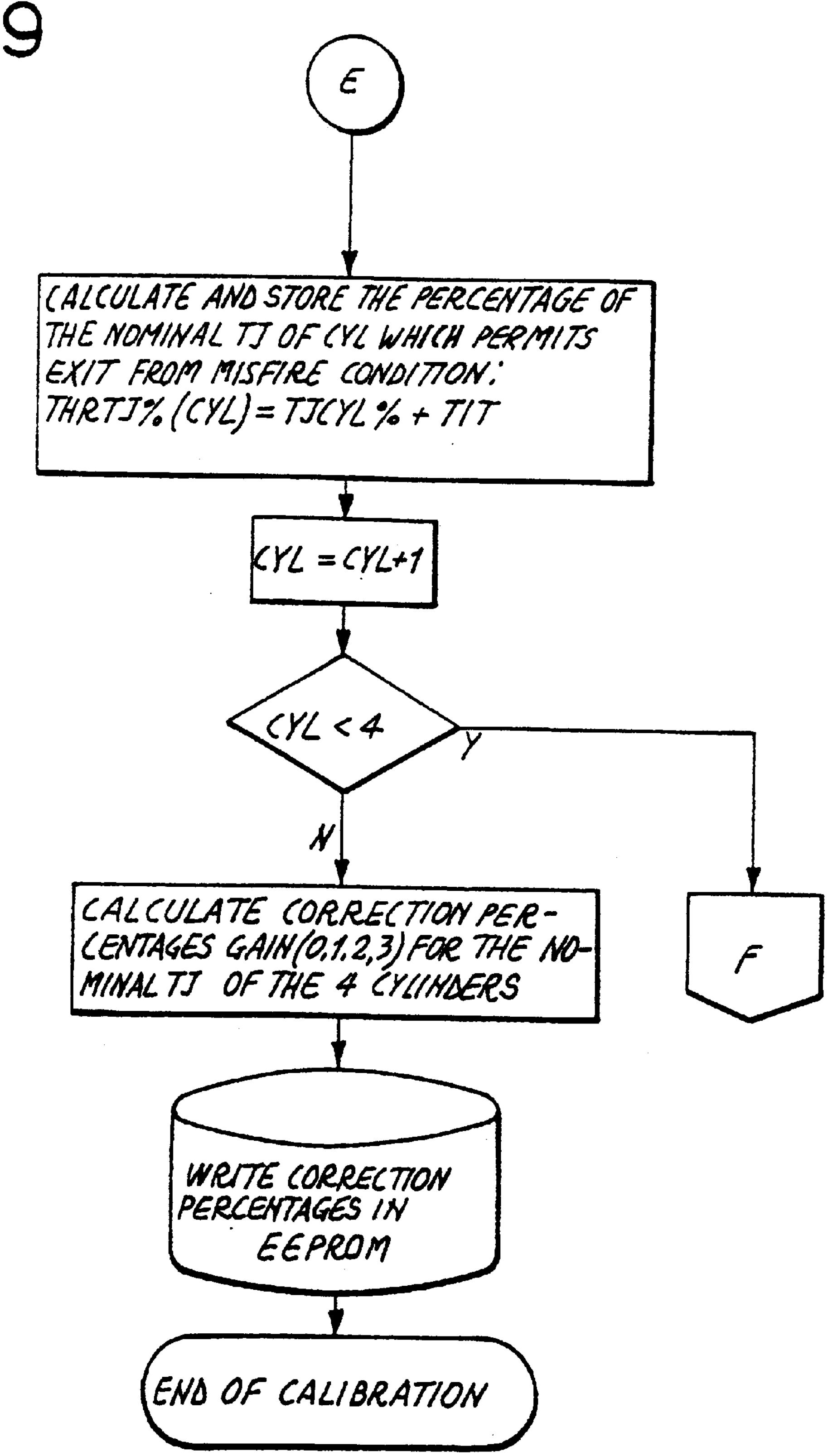
Figure 10:
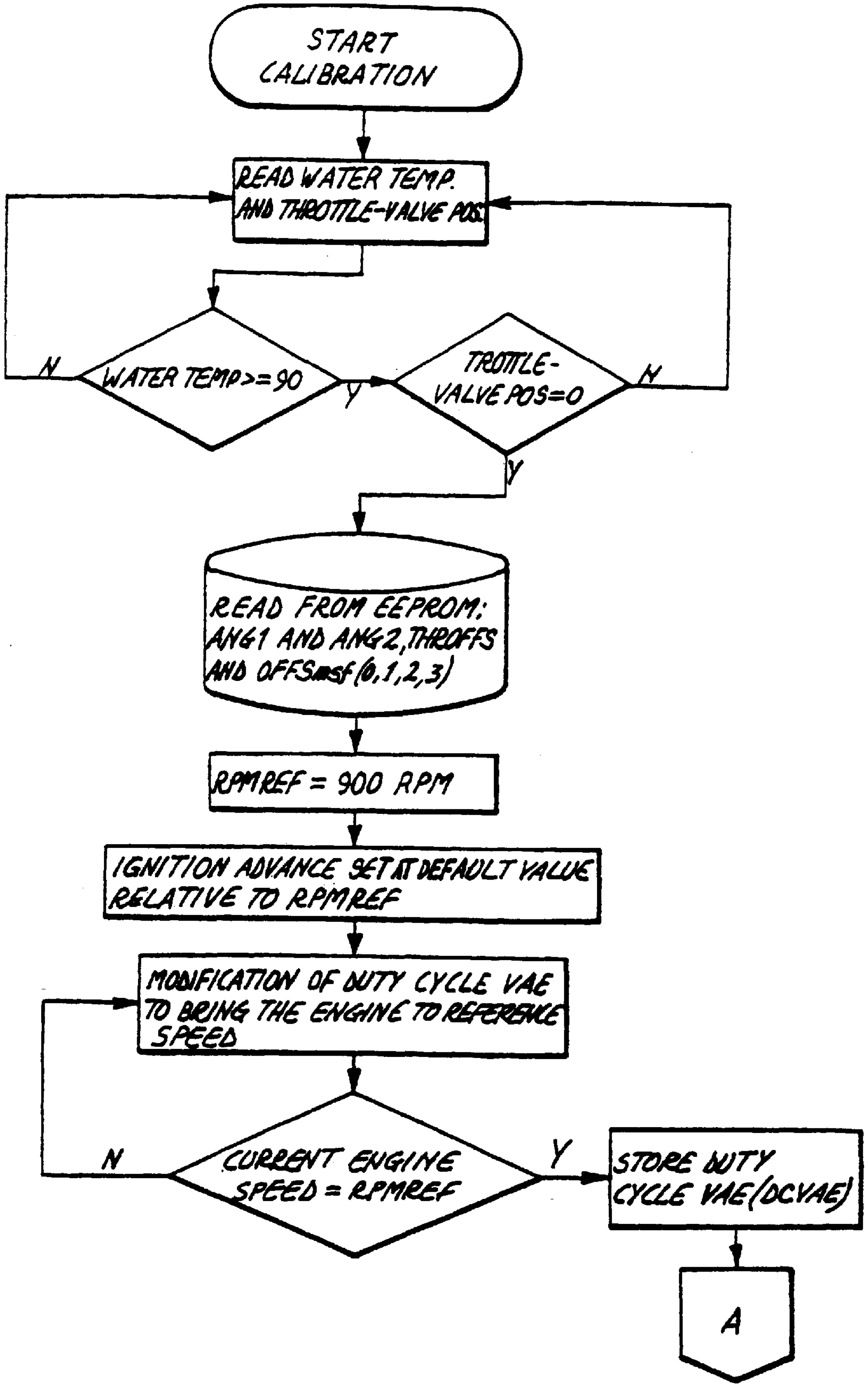
Figure 11:
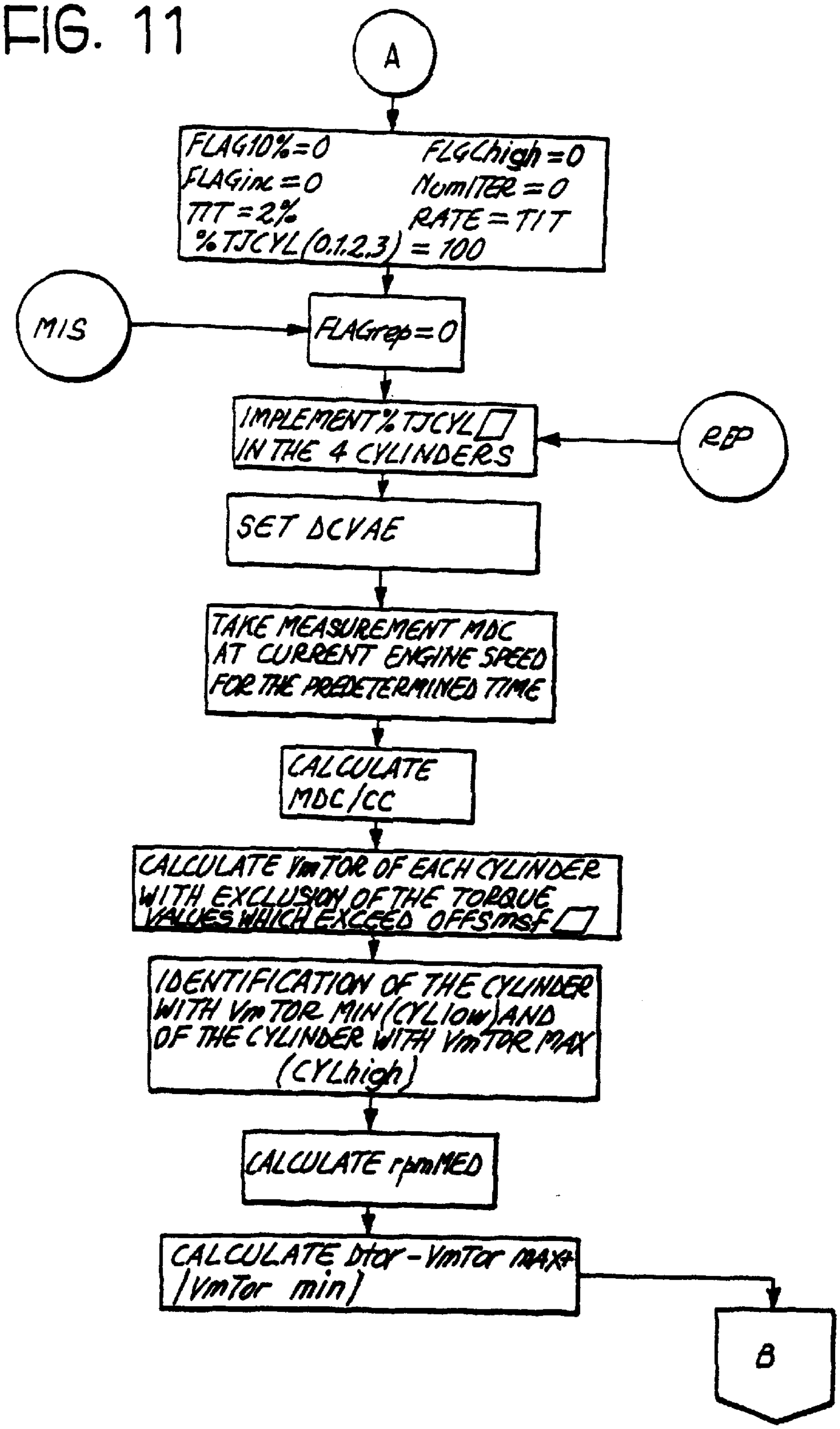
Figure 12:
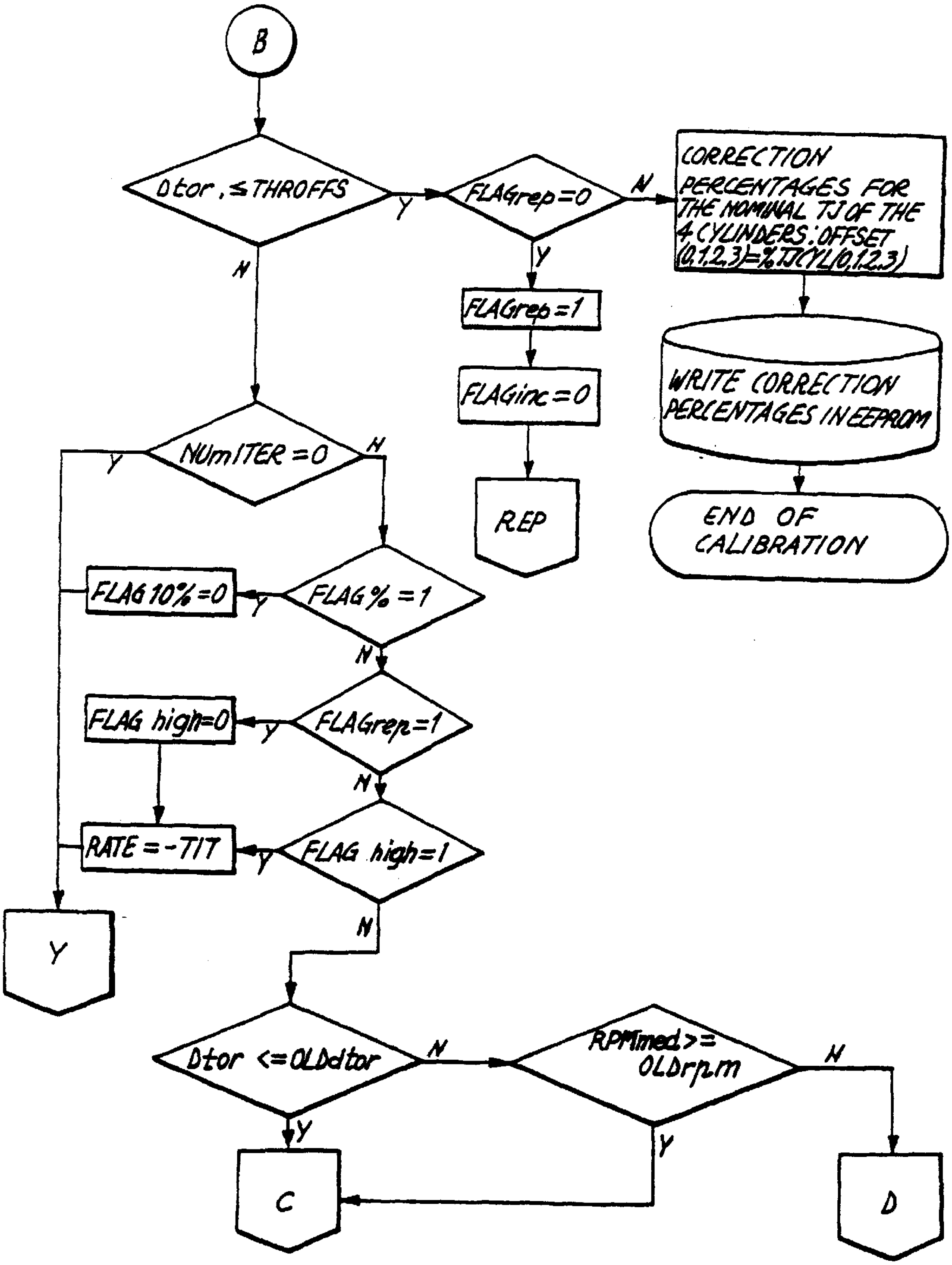
Figure 13:
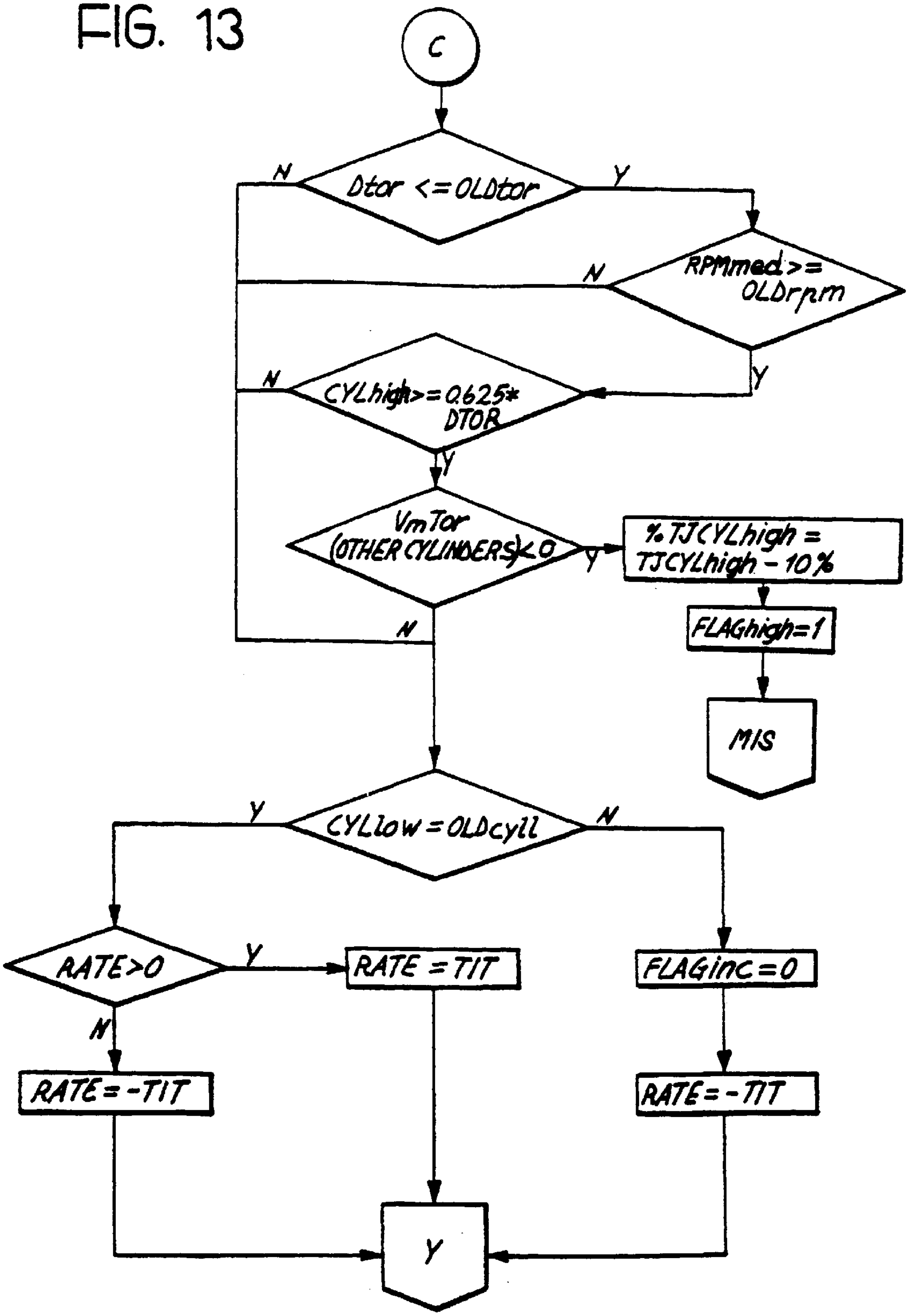
Figure 14:
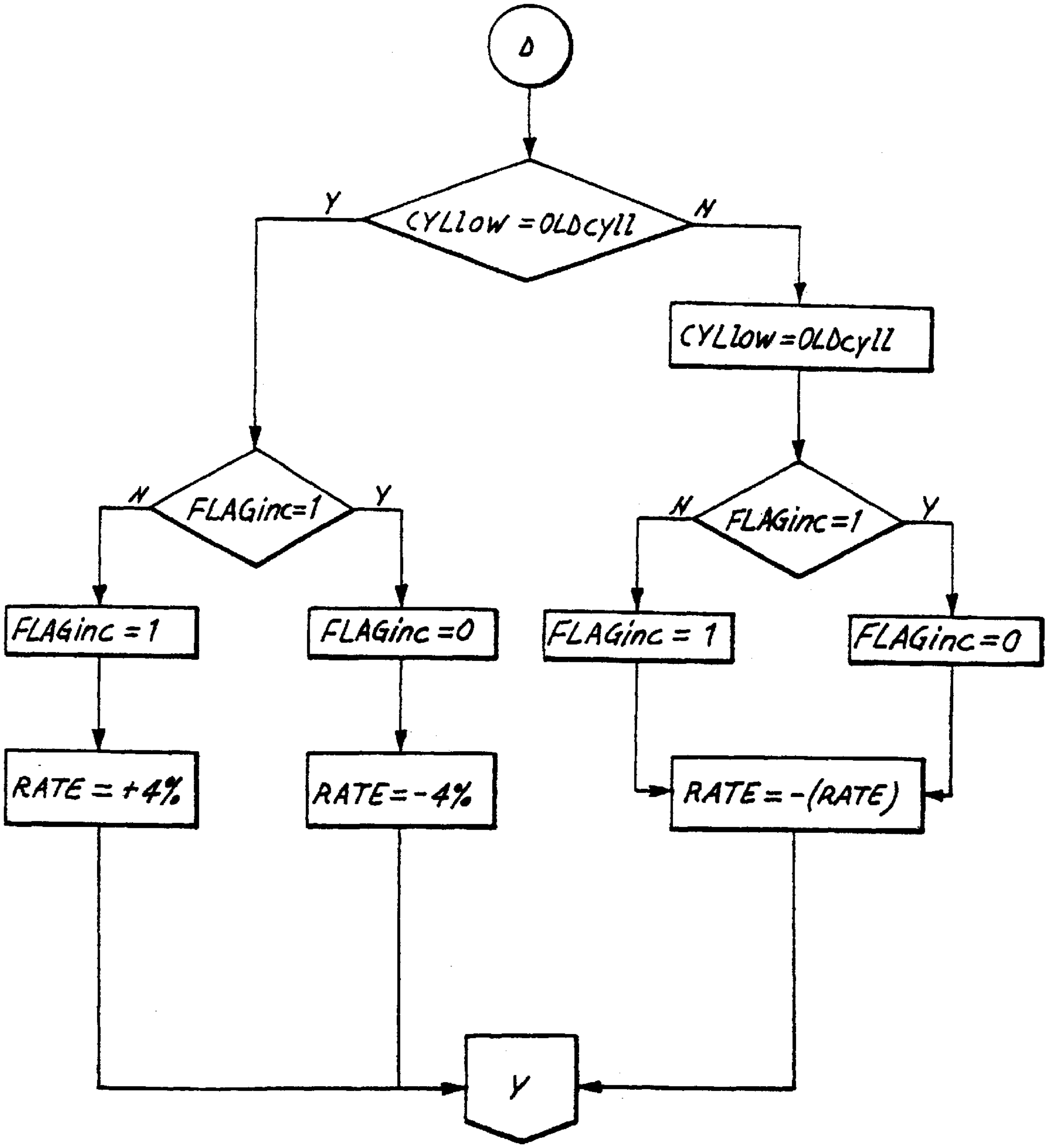
Figure 15:
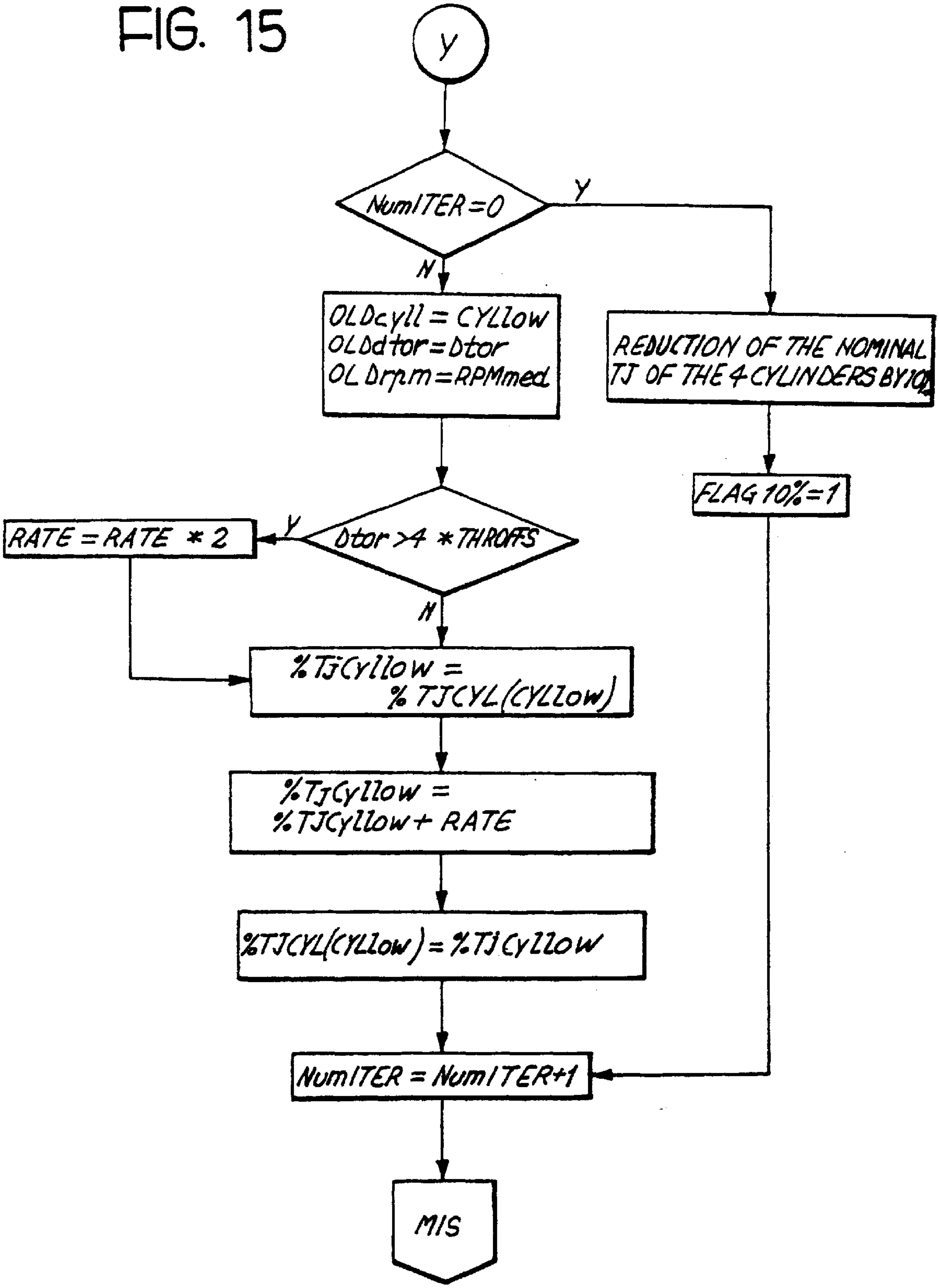

Further advantages and characteristics of the present invention will become clear from the following detailed description given with the aid of the appended drawings, provided by way of non-limiting example, in which:

FIG. 1 is a schematic block diagram of an injection system configured for implementing the method according to the present invention, FIG. 2 comprises three Cartesian graphs illustrating the zero-offset calibration of the injectors carried out by means of the method according to the invention, FIG. 3 is a Cartesian graph illustrating the zero-offset calibration of the injectors carried out by means of the method according to the invention, FIGS. 4 to 9 represent a flow chart illustrating a possible embodiment of the flow-rate gain calibration carried out by means of the method according to the invention.

Figure 16:
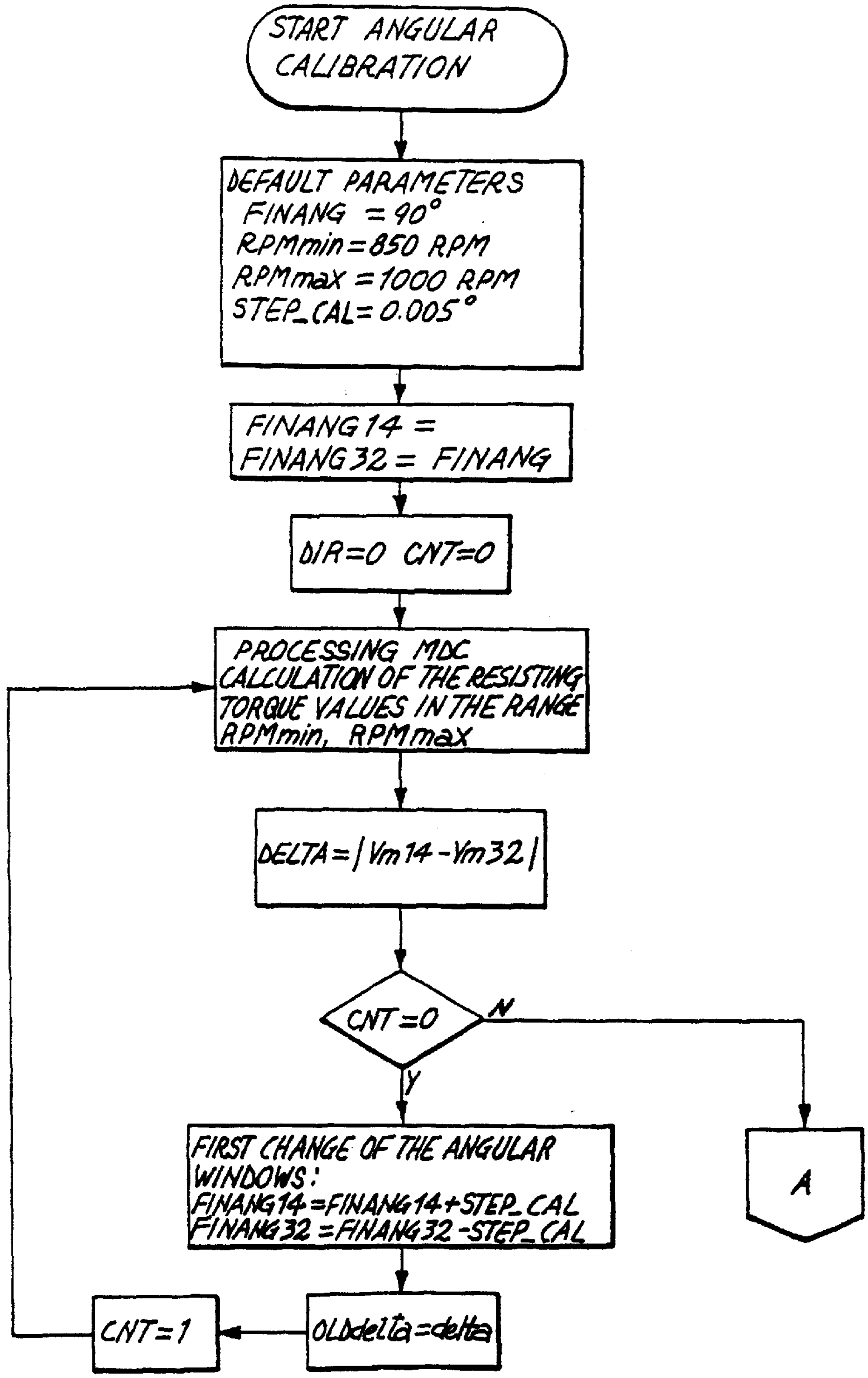
Figure 17:
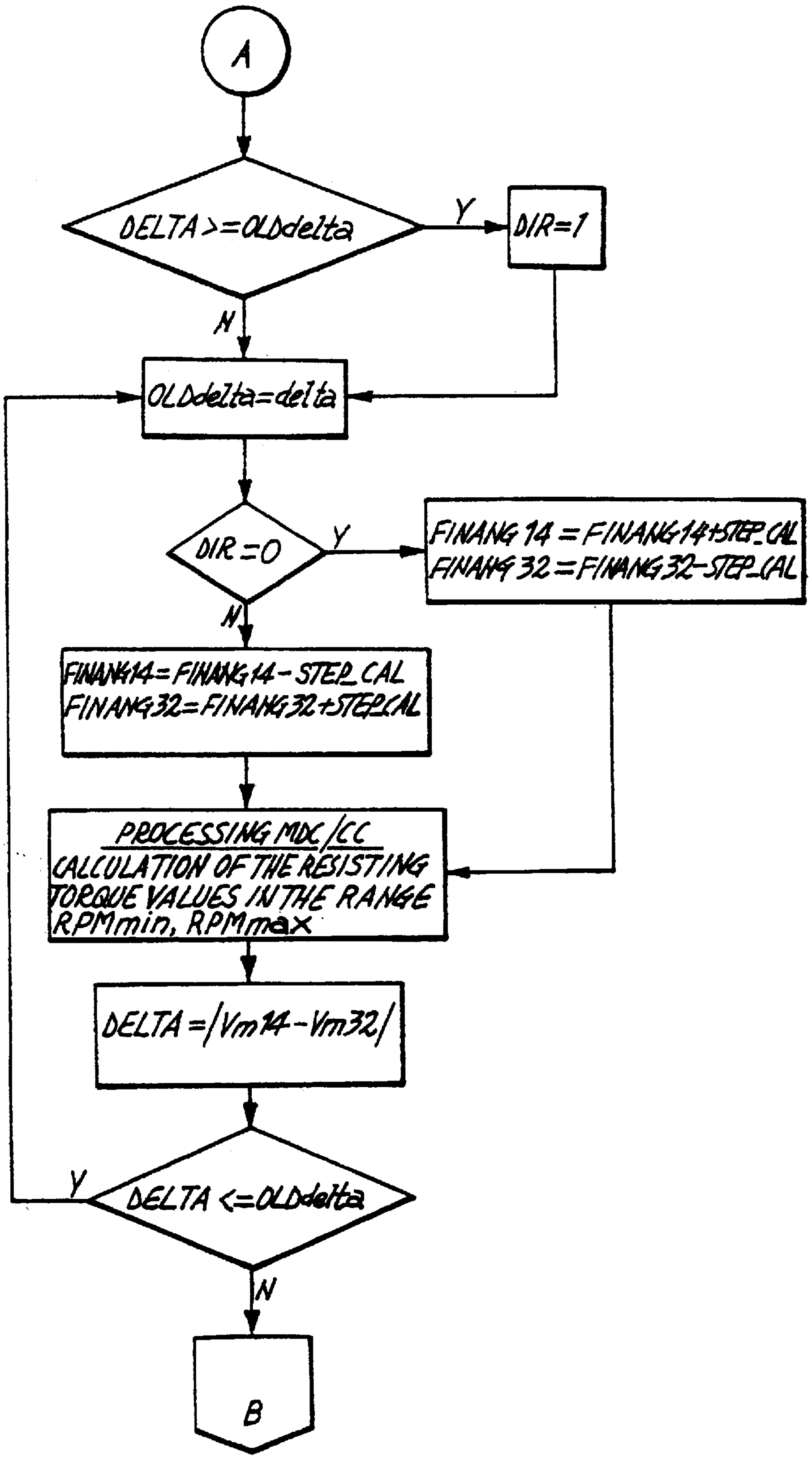
Figure 18:
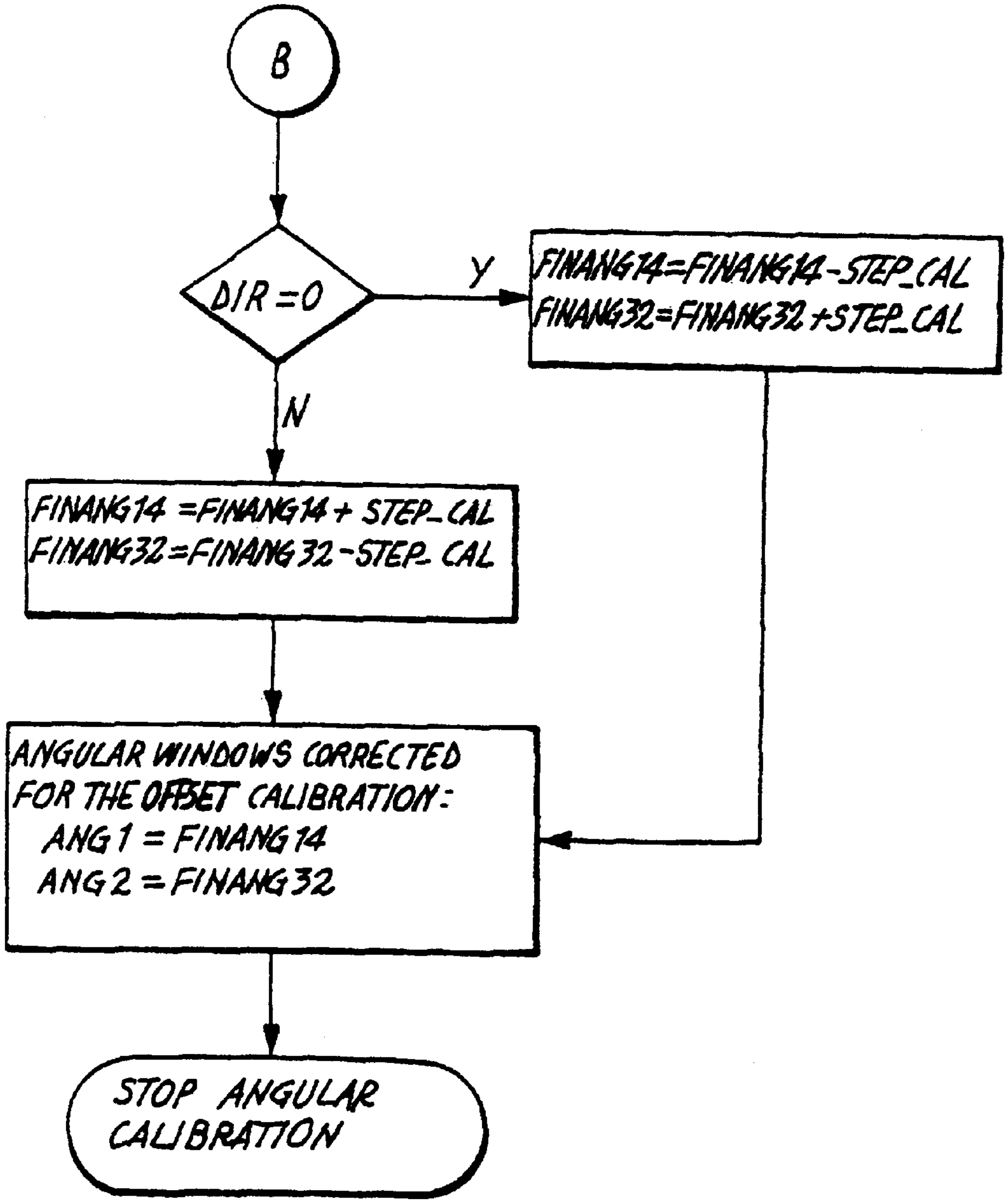

FIGS. 10 to 15 represent a flow chart illustrating the zero-offset calibration carried out by means of the method according to the invention, FIGS. 16 to 18 represent a flow chart illustrating the calibration of the angular windows carried out by means of the method according to the invention.

The present invention is based fundamentally on the use of a misfire-detection method performed by a dynamic torque measurement which, in addition to this function (which has been validated by the Applicant both on a theoretical model and by tests on various road surfaces) enables the injectors to be calibrated or re-matched both with low admission times (zero-offset) and with high admission times (flow-rate gain).

A low admission time means that the time during which the injectors are open is short, for example, because the engine is operating at idling speed. A high admission time, on the other hand, means that the time for which the injectors are open is long, which means that the amount of fuel admitted to the cylinders is large since the engine is required to deliver a high power, for example, during acceleration.

Some methods which can be used for detecting and measuring the torque pulses imparted by the explosions which occur in the engine are known in the art. For example, the Applicant's European patent application No. EP-A-0 637 738 filed on Aug. 2, 1994 describes a method for the dynamic measurement of the torque in a shaft of an internal-combustion engine.

An expert in the art can easily produce an electronic control unit implementing the method according to the present invention by means of one of these methods of detecting and measuring the torque pulses in the engine.

According to a method of this type, by measuring the torque pulses transmitted to the engine shaft by each of the cylinders of the engine, it is possible to determine indirectly the amount of fuel injected into each of the cylinders. Since the open time of each injector is known, the amount of fuel injected into each cylinder is proportional to the flow-rate characteristic of the injector associated with the cylinder. The method according to the present invention therefore provides for the detection of this measurement by means of the aforementioned dynamic torque method, in relation to the flow-rate characteristics of the injectors fitted in the internal-combustion engine.

This information can therefore subsequently be used to calibrate the injection system or, more precisely, the electronic control unit used for controlling the injection system, in dependence on the flow-rate characteristics of each of the injectors of the system. In practice, after the method according to the present invention has been implemented, the electronic control unit no longer operates all of the injectors of the engine with the same open time in order to inject a given quantity of fuel but operates each individual injector with a different open time in a manner such that, in all operating conditions, each injector admits the same amount of fuel (or in any case the precise amount calculated by the control unit) to the cylinder with which it is associated. The operation of the internal combustion engine is thus much more regular since combustion is balanced in the various cylinders.

The injectors are calibrated and the combustion thus balanced with the vehicle stationary with the gearbox in neutral, upon request by an operator, by means of an electronic processor (for example, a personal computer) connected by means of a serial line to a diagnostic socket of an electronic control unit of the engine. In these conditions, the control unit performs a measurement cycle, upon completion of which it has available the elements for calibrating the open times of the injectors so as to minimize combustion imbalances both during idling and under power.

This information enables the injection system to be reset or recalibrated cylinder by cylinder, also providing a considerable contribution to both workshop and "on-board" engine diagnostics.

This method can be implemented in the factory, enabling uncalibrated injectors or injectors with large tolerances to be fitted, considerably reducing their production costs, or by a technical service centre (for example, during periodic checks) and can then be supplemented by a similar operation performed during normal use of the vehicle by the user.

This method can also be extended to the production of engines characterized by an idling speed reduced to 600–650 rpm with a view to reducing consumption, supplemented by a corresponding re-dimensioning of some of the components and optimization of system efficiency.

The method proposed can also operate in the absence of the timing signal since it can synchronize the timing of the input of the speed and synchronism signal (TDC) with the desired cylinder by generating a missed injection each time the engine is started. A method of synchronization in the absence of a timing signal is described, for example, in the Applicant's European patent application No. 96119352.1 filed on Dec. 3, 1996.

A currently-preferred embodiment of the method of calibrating the injectors will now be described in greater detail.

For a better understanding of the method according to the present invention, FIG. 1 shows an injection system configured so as to enable the method to be implemented.

Naturally, as is widely known in the art, the injection system is associated with or is an integral part of an internal-combustion engine M. As is clear from the foregoing, the method is for use in internal combustion engines having injection systems comprising a plurality of individually-controlled injectors. These systems, which nowadays are ever more widespread, are known as multipoint timed sequential injection systems.

Typically, these systems comprise one injector for each cylinder of the engine M. The most usual case is that of an engine M with four cylinders and thus comprising four injectors, generally indicated I, as shown in the drawing. These injectors I are controlled, as stated, by a control unit ECU used for controlling the fuel-injection system of the engine M.

Typically, the control unit ECU is an electronic control unit used for the overall management of the engine M so that, in addition to the injection system, it also controls ignition and possibly other functions of the engine M. The control unit ECU is therefore connected, by means of electrical lines, to actuators, such as the injectors I, disposed in the engine M, and is also connected to sensors, also disposed in the engine M, for detecting its operating quantities so as to be able to perform its own control functions.

One of these sensors, as stated, is a phonic-wheel sensor RF typically constituted by an electromagnetic detector (or pick-up) associated with a pulley which is toothed or, in any case, has notches, and which is keyed to the drive shaft of the engine M. This phonic-wheel sensor RF can detect a set of data useful for the management of the engine M such as, for example, the speed or rate of rotation rpm, and a synchronization or top-dead-centre signal (TDC).

As stated above, this phonic-wheel sensor RF can also detect and measure the torque pulses imparted to the engine shaft by each explosion occurring in the cylinders of the engine M, by the above-mentioned dynamic torque-measurement method.

The control unit ECU also has a diagnostic socket PD enabling it to be connected to external processing devices having, for example, diagnosis, detection or control functions. From a physical point of view, this diagnostic socket PD consists, essentially of a connector and, typically, is present in all modern electronic control units. During the implementation of the method according to the invention it is therefore possible to connect an external processor, for example, a personal computer PC to the diagnostic socket PD of the control unit ECU, by means of a serial communication line LS.

It should therefore be noted that, from the point of view of physical components, the injection system shown in FIG. 1 is almost identical to a conventional injection system formed in accordance with the prior art. The differences in comparison with injection systems according to the prior art consist essentially of the additional procedures which the method according to the invention involves and which have to be programmed in the electronic control unit ECU and/or in the processor PC.

As will be clear to an expert in the art, these procedures do not necessarily have to be carried out by the processor PC or by the control unit ECU but may be carried out by either one or the other or partially by one and partially by the other. Decisions relating to which unit (the processor PC and/or the control unit ECU) is to carry out these procedures depend essentially on design selections.

There are, however, some characteristics in which the injection system configured for implementing the method of the invention may differ from systems of the prior art. For example, in a currently-preferred embodiment, the method provides for the values for compensating for the different flow-rates of the injectors, which values are obtained in the course of the calibration, to be stored in a non-volatile read and write memory (not shown), for example an EEPROM memory provided in the control unit ECU and connected to a microprocessor (not shown) which constitutes the processing unit of the control unit ECU. If the control unit ECU does not have a non-volatile memory, it is therefore necessary to provide it with a memory of this type to enable the method according to the invention to be implemented.

It is known, however, that an injection system suitable for the implementation of the method according to the invention can be produced at a cost substantially identical to that of an injection system according to the prior art.

The flow-rate characteristic of an injector within the ranges of normal use (from about 3 to 20 msec open time) can be approximated to a straight line, since the transitory opening and closure states of the injector obturator occur in times which are marginal in comparison with its overall operation time. As is known, a straight line can be identified if at least two points, preferably spaced apart for reasons of accuracy, belonging to the straight line, are known.

To identify accurately the admission characteristic, that is, the flow-rate of an injector, it therefore suffices to know the deviation from zero, that is, the zero-offset at idling admission values and the angular coefficient calculated at the maximum admission values.

For these reasons, the method according to the invention provides for the calibration of the injectors I to be carried out in two separate steps:

| | |
|---|---|
| 1. | calibration of the flow-rate gain (carried out with full admission with a series of accelerations without load); |
| 2. | calibration of the zero-offset (carried out by operating on the engine at idling speed [about 900 rpm]). |

In an engine M with a catalytic converter, the calibration of the zero-offset and of the flow-rate gain of the injectors I affords the following advantages:

it enables the production tolerances to be widened (reducing rejects and processing and calibration costs) of the injectors I.

it lengthens the life of the catalyst (the control unit ECU of the injection system operates on more repeatable and predictable lambda-probe signals);

it improves the performance of the engine M (consumption, pollution, roughness).

To render this method repeatable, calibration is enabled only when the coolant temperature has reached 90° C. and, at the same time, the throttle-valve of the engine M is closed.

During the two calibration steps, the solenoid valve for the cooling of the radiator of the engine M must be inactive to prevent speed disturbances due to its activation/deactivation. This phenomenon lengthens the times taken to perform the calibration since it is necessary to discard a detection carried out when the fan is operating and to repeat it.

For correct calibration of the injectors I, the two steps have to be carried out in sequence in the following order:

| | |
|---|---|
| 1. | calibration of flow-rate gain, |
| 2. | calibration of zero-offset. |

The first step of the method (calibration of flow-rate gain) provides for the calibration of the injectors I with full admission. During this step, some quantities essential for the correct execution of the timing-offset calibration are calculated, that is: the correct angular bases, the thresholds for the detection of misfires in the four cylinders, and the offset-calibration exit threshold. Upon completion of the gain calibration, the engine M is automatically switched off. After it has been re-started, it is necessary to carry out the second step of the method (calibration of the zero-offset) in order to complete the calibration of the injectors I.

Upon completion of these two steps, the injection-time correction factors are identified and stored in the control unit ECU.

The calibration steps will be described in detail below. These steps are also illustrated by the flow charts shown in FIGS. 4 to 18.

In these drawings and in the following description, the following references have been adopted for brevity:

| | |
|---|---|
| TJ: | injector open time; |
| NREP: | number of accelerations to be performed for each individual calibration step; |
| TIT: | percentage reduction of the TJ applied to the individual cylinder for each step of the calibration during the investigation of the THRTJ % (the percentage of the nominal TJ which permits exit from the misfire condition); |
| ANG1-2: | angular windows corrected for offset; |
| THROFFS: | offset-calibration exit threshold; |
| OFFSmsf []: | misfire threshold of each cylinder; |
| RPMREF: | reference engine speed |
| TIT: | percentage reduction/increase of the TJ applied to the individual cylinder for each calibration step; |
| % TJCYL [0,1,2,3]: | percentage of the nominal TJ implemented in the individual cylinder; the correction percentage is derived from this value; |
| VmTor: | mean torque value; |
| max,min: | maximum and minimum mean torque values extrapolated from the VmTors of the 4 cylinders; |
| RPMmed: | mean engine speed value; |
| DTor: | current torque spread; |
| FINANG: | actual angular-window value; |
| RPMmin RPMmax: | range of engine speeds within which to carry out the angular calibration; |
| STEP_CAL: | increment/decrement step of the angular windows to be corrected; |
| FINANG14: | angular window CYL. 1 and 4; |
| FINANG32: | angular window CYL. 3 and 2; |

-continued

| | |
|---|---|
| delta: | difference between the mean resisting torque values of CYL. 1 and 4 and of CYL 3 and 2; |
| Vm14: | mean resisting torque value CYL. 1 and 4; |
| VM32: | mean resisting torque value CYL. 3 and 2. |

The flow-rate gain calibration step will now be described.

The method of calibrating the flow-rate gain is based on the detection of the ignition "limits" which the individual cylinders have with respect to the nominal fuel-admission values, upon the assumption that they reach the misfire condition at the same air/fuel ratio.

The flow-rate gain calibration is carried out with the vehicle stationary with the engine M in neutral and is activated, upon the operator's request, by means of a personal computer PC connected by means of a serial line LS to the diagnostic socket PD of the electronic control unit ECU of the engine M.

After receipt of enablement to carry out the calibration (that is, after a check that the engine M is at the normal running temperature and that the throttle-valve is in the closed condition) the operator must depress the accelerator fully, keeping it in this position until completion of the calibration, indicated by the switching-off of the engine M.

It should be noted that the entire calibration is carried out in an open loop to prevent corrective interventions by the lambda probe during the procedure.

At this point, a series of accelerations without load is carried out with the throttle-valve fully open, during which the air-fuel ratio of the mixture is progressively increased within a limited range of speeds, for example 1200–3600 rpm, until a misfire is caused and is detected by the dynamic torque-measurement method.

The reduction is carried out on one cylinder at a time (in accordance with the firing order), by reducing the nominal open times of the injectors I for a single engine cycle between 2200 and 2700 rpm.

The accelerations without load are carried out automatically since the control unit ECU initially establishes the speed ranges by modifying the values mapped for the maximum limiter. This range is between 1200 and 3600 rpm.

The flow-rate gain calibration is divided into four stages:

| | |
|---|---|
| 1.1 | identification of zero-offset calibration parameters |
| 2.1 | identification of misfire threshold of the individual cylinder |
| 3.1 | investigation of the ignition limits of the individual cylinder |
| 4.1 | calculation and storage of the correction percentages |

which will now be described.

1.1 Identification of Zero-offset Calibration Parameters

This stage comprises the first two accelerations without load in succession in time, carried out within a speed range of between 800–3600 rpm.

In the deceleration stage of the first acceleration, the parameters to be used for calibrating the zero-offset are calculated and stored:

ANG1, ANG2: angular bases corrected for the speed reading for the calculation of the dynamic torque measurement. The nominal value of the angular base is 90°.

OFFSmsf[0,1,2,3]: adaptive threshold for the detection of misfires in the four cylinders, related to the resisting torque during idling.

THROFFS: zero-offset calibration exit threshold equal to 8% resisting torque measured at the reference speed (RPMREF=900 rpm).

The second acceleration, which can be called the synchronization acceleration, enables the speed range used (800–3600 rpm) to be modified to the default range (1200–3600 rpm) which is to be maintained until completion of the calibration.

In this stage the nominal injection times do not undergo any alterations.

2.1 Identification of the Misfire Threshold of the Individual Cylinder

This stage is carried out with three accelerations and identifies the misfire threshold of the cylinder (THRMSF) which will subsequently be acted upon for the detection of the ignition limits (starting with cylinder no. 1).

During each acceleration, an injection time equal to 1% of the nominal value (indicated TJCYL %=100) is implemented in the cylinder under test for a single engine cycle between 2200–2700 rpm so as to generate a single missed injection.

The misfire threshold (THRMSF) of the cylinder under test is calculated from the mean value of the measured torque (TMSF) corresponding to the three misfires generated.

3.1 Investigation of the Ignition Limit of the Individual Cylinder

Upon completion of the first two calibration stages just described, which may be defined as preparatory stages, the ignition limit of the individual cylinder is identified.

This last calibration stage comprises three separate steps:

| | |
|---|---|
| 3.1.1 | reduction of the nominal injection time (TJCYL % = 100) starting from 30% initial (REDTJ % = 30) so that: TJCYL % = TJCYL % − REDTJ % = 70 with successive 10% decrements (REDTJ % = 40, 50, . . . ) until a misfire is detected. |
| 3.1.2 | increase of the current nominal injection time (that is, the reduced time of the previous step TJCYL % = 100 − REDTJ %) with successive 10% increments (REDTJ = 50, 40, 30, . . . ) which permit exit from the misfire condition. |
| 3.1.3 | progressive reduction of the current nominal injection time (that is, that resulting from the alterations undergone in the previous step) by 2% (TIT) until the percentage of the nominal injection time at which misfiring starts is identified with greater precision. |

Upon completion of this stage, the percentage of the nominal injection time which permits exit from the misfire condition (THRTJ %[0, . . . ]=TJCYL %+TIT), which is essential for the calculation of the correction percentages, is calculated.

It is important to note that, in this part of the calibration as well, every increase/reduction of the nominal injection time (TJCYL %) is carried out during the acceleration stage in the cylinder under test for a single engine cycle between 2200–2700 rpm. Steps 3.1.2 and 3.1.3 just described are repeated for all of the cylinders in accordance with the firing order.

4.1 Calculation and Storage of the Correction Percentages

Upon completion of the steps described above, the four correction percentages (one per cylinder, GAIN [0,1,2,3]) of the nominal injection which enable the flow-rate gain to be calibrated, are calculated and stored in a non-volatile memory, for example, of the EEPROM type, as stated above. To derive these parameters, it is necessary to calculate:

the mean value (VmTHRTJ %) of the percentages of the nominal injection time of each cylinder which permit exit from the misfire condition (THRTJ % [0,1,2,3]);

the deviation of each percentage from the mean value.

The correction percentage is thus calculated as the sum (in sign) of the nominal injection time (TJCYL %=100) and the deviation for each cylinder.

The multiplication factor for correcting the nominal injection time will then be derived at the time of use as the ratio between the correction percentage of the individual cylinder and 100.

EXAMPLE

| percentages of the injection times of the 4 cylinders which permit exit from the misfire condition: |
|---|
| THRTJ % [0] = 60 |
| THRTJ % [1] = 75 |
| THRTJ % [2] = 70 |
| THRTJ % [3] = 75 |
| VmTHRTJ % = 70 |
| calculation of the deviation of each percentage from the mean value: |
| dev % [0] = THRTJ % [0] − VmTHRTJ = −10 |
| dev % [1] = THRTJ % [1] − VmTHRTJ = +5 |
| dev % [2] = THRTJ % [2] − VmTHRTJ = 0 |
| dev % [3] = THRTJ % [3] − VmTHRTJ = +5 |
| calculation of the correction perentages: |
| GAIN [0] = TJCYL % + dev % [0] = 90 |
| GAIN [1] = TJCYL % + dev % [1] = 105 |
| GAIN [2] = TJCYL % + dev % [2] = 100 |
| GAIN [3] = TJCYL % + dev % [3] = 105 |

The step of calibrating the zero-offset at idling speed will now be described.

The zero-offset calibration step follows the flow-rate-gain calibration step in time but, in order of importance, is certainly the procedure to be applied most frequently since the offset is subject to greater drift than the gain.

The zero-offset calibration is also carried out with the vehicle stationary with the engine M in neutral. Activation is again provided by the operator by means of a personal computer PC connected by means of a serial line LS to the diagnostic socket PD of the electronic control unit ECU.

In this case also, calibration is enabled after a check that the engine M has reached normal running temperature and that the throttle-valve is in the closed condition. This waiting period is practically zero if the offset calibration follows immediately after the gain calibration.

Initially, disablement of the idling-speed control strategies by the forcing, by means of the program, of a position of the throttle-valve other than zero, and disablement of the lambda probe (open circuit) are effected. This operation prevents undesired interventions during the implementation of the method. The engine speed is brought, for example, to 900 rpm (indicated RPMREF) by the operation of an air valve (bypassing the throttle-valve) controlled by the control unit ECU and with the ignition advance fixed and locked, for example at 15 degrees. When the reference speed indicated is reached, the duty cycle (indicated DCVAE) of the controlled air valve is stored.

The ignition advance and the duty cycle DCVAE of the air valve are kept fixed throughout the duration of the calibration, regardless of the operating conditions of the engine M.

Upon completion of the preparation stage, the zero-offset calibration provides for at least four main stages (described in greater detail by the flow chart in FIGS. 10 to 15), of which the first three are repeated for each individual calibration stage:

| | |
|---|---|
| 1. | implementation of the corrected injection times, |
| 2. | application of the dynamic torque-measurement method, |
| 3. | comparision of the torque spread with the calibration exit threshold, |
| 4. | storage of the correction percentages, |

and will now be described.

1. Implementation of the Corrected Injection Times

The first stage of the calibration is performed with the nominal injection times (%TJCYL[0,1,2,3]=100) implemented by the control unit ECU in the above-described working conditions of the engine M (RPMREF, advance and DCVAE). During the execution of the calibration, the admission time values are altered by a known percentage on the basis of the reduction/increase operations carried out.

2. Application of the Dynamic Torque-measurement Method

Upon completion of the previous step, a dynamic measurement of the torque is carried out for a predetermined time. Upon completion of the measurement the dynamic torque-measurement method is used to calculate:

the mean torque value of each cylinder (VmTor[0,1,2,3]) relating to the torque measurement corrected for any misfires (by comparison of the individual values calculated with the threshold OFFSmsf[0,1,2,3]);

the mean engine speed (RPMmed) at which the measurement was carried out;

the torque spread (DTor).

The cylinders which deliver the highest driving torque (CYLhigh) and the lowest driving torque (CYLlow) are also identified.

3. Comparison of the Torque Spread with the Calibration Exit Threshold

The main object of the calibration is to minimize the firing imbalances between the cylinders. For this reason, after each intervention carried out on the injection times and torque measurements, the DTor is compared with the threshold THROFFS. This check may give rise to two results:

1. DTor less than THROFFS

The previous points (1–2) are repeated to try to confirm what was found. If the same result is obtained for a second time, that is, DTor is still less than THROFFS, this means that the minimum possible torque spread between the cylinders has been reached (apart from intrinsic firing imbalances of the engine M). The zero-offset correction percentages are then stored and the calibration is interrupted.

2. DTor Greater than THROFFS

There are three methods of determining which operations to carry out after calibration, according to whether the first, second or subsequent calibration stages are involved.

In the first calibration stage which is carried out with nominal injection times implemented by the control unit ECU, these values are reduced by 10% (%TJCYL[0,1,2,3]=90) simultaneously in all of the cylinders. This operation is carried out, as in the first calibration stage, to check that the cylinder which delivers the lowest torque is not affected by excess fuel since this cylinder (CYLlow) would tend to be enriched as the calibration continued.

In the second calibration stage, as in the subsequent stages, the method is implemented initially in the cylinder which delivers the lowest driving torque. (CYLlow) with a 2% reduction (TIT) in the current nominal injection time (%TJCYL[0,1,2,3]=90).

It should be noted that this 2% reduction is always carried out as the first operation upon every change from one cylinder to another.

In subsequent checks, if DTor is greater than THROFFS, the method goes on directly to a simultaneous check of the DTor and of the mean speed (indicated RPMmed) since a reduction in the torque spread between the cylinders should bring about a consequent increase in engine speed.

Thus:

if DTor is reduced and/or RPMmed increases, this means that the calibration is going in the right direction (CONVERGEnce).

The measures which may be taken in this situation are of three types:

if CYLlow has not changed, then an intervention on the injection time of CYLlow similar to the previous intervention (reduction or increase) is carried out;

if CYLlow has changed, the first intervention is carried out on the new cylinder, again with a 2% reduction (−TIT);

if CYLhigh delivers an excessive driving torque (that is VmTor of CYLhigh is greater than 62.5% of DTor) it is necessary to reduce the admission time of this cylinder by a further 10%;

if DTor increases and RPMmed decreases this means that the intervention carried out did not lead to the desired effect (CONVERGEnce) and the calibration is therefore preceding in the wrong direction (DIVERGEnce). In this condition, there are two modes of operation:

if CYLlow has not changed, it is necessary to reverse the strategy used on that cylinder from reduction to increase or vice versa;

if CYLlow has changed, the situation preceding the change carried out on the injection time of CYLlow is re-established.

The various operations indicated in these three stages are also carried out several times on the various cylinders until the DTor is below the threshold THROFFS.

4. Storage of the Correction Percentages

Upon completion of the calibration, the four correction percentages (one per cylinder), OFFSET[0,1,2,3] of the nominal injection time which enable the zero-offset to be calibrated are stored in the non-volatile memory.

In practice, these parameters represent the percentages of the nominal injection time of each cylinder (%TJCYL[0,1, 2,3]) derived upon completion of the calibration.

The multiplication factor for correcting the nominal injection time will then be derived at the moment of use as the ratio between the correction percentage of the individual cylinder and 100.

Implementation of the Calibration

Upon completion of the two calibration steps (gain and offset) the injection-time correction percentages are resident in the non-volatile memory connected to the microprocessor of the control unit ECU ready for use.

The implementation of the calibration during normal use of the vehicle takes place by updating, by interpolation, of the injection times calculated by the control unit ECU from the maps resident in the memory.

It is thus possible to calculate the corrected flow-rates of the injectors I, even on the intermediate admission values (choked operation of the engine M), of the entire mapping of the engine M.

The measurements carried out during the calibration require great precision in the cutting of the pulleys used for the phonic-wheel sensor RF which generates the synchronization or top-dead-centre signal TDC (4 or 60−2 pulses per revolution).

To compensate for angular errors in the cutting of the pulleys over the production spread, a method has been implemented, in this connection see the flow chart for the calibration of the angular windows of FIGS. 16 to 18, which automatically calculates the two reading bases (ANG1, ANG2) during the release stage in which the speed is allowed to drop, carried out in the gain-calibration stage (stage 1.1—Identification of the zero-offset calibration parameters).

The speed measurements have to be taken over angles of 90°. When a pulley with 60−2 teeth is used, it is therefore necessary to perform a division during the processing in order to bring the angular bases down to four per revolution, timed as for a pulley with 4 pulses.

The calibration method described herein is valid if carried out on an engine M which is not subject to compression imbalances. If such anomalies are present, these have to be identified in any case by means of a further measurement stage forming part of the method according to the present invention in a currently-preferred embodiment described below.

Measurement of the compression seal cylinder by cylinder by the torque-measurement technique plays an important part in engine diagnostics. This measurement, which is quite difficult to carry out by conventional methods, is the first step to be carried out in order to adjust or calibrate the injection system.

In fact, if a low torque is detected for a given cylinder, its cause may be attributed to insufficient fuel admission when the true anomaly actually results from poor compression due, for example, to the leaktightness of the valves or of the piston rings. In this case, the calibration procedure would tend to increase the injection time and hence the fuel admitted to a cylinder which is already operating with a lack of air, further worsening the working conditions of the cylinder.

When a vehicle is characterized or tuned by correlation of its performance with the emissions, difficulty is often encountered in keeping the limits of the various pollutants emitted within the norm, even in engines which appear to be tuned correctly. In these cases, the detection of the compression imbalances often shows up small anomalies in the leaktightness of the valves which, whilst they do not affect performance, are sufficient to lead to the discharge of unburnt hydrocarbons which damage the catalyst within a short time.

The compression test enables the anomaly to be attributed unequivocally to the cylinder concerned, warning the operator of the appearance of a problem in the filling of the cylinder.

The characterization of compression imbalances may be carried out, for example, during the accelerations without load relating to the gain calibration, by examination of the 1500–1200 rpm range for each deceleration.

Test Method

The compression leakages per cylinder are determined by measurements carried out by the dynamic torque-measurement method by the acquisition, in a currently-preferred embodiment, of the speed at the release stage with the engine M switched off, that is, in the absence of injection, over a speed range, for example, of between 900 and 350 rpm.

Over such a limited speed range, the number of useful measurements which can be made overall on the four cylinders is reduced to 6–10 values each time the engine M is switched off; it is therefore necessary to keep the history of at least 10 switchings-off in the memory.

The mean resisting-torque value cylinder by cylinder is correlated with the leakage sections of the various cylinders.

To reach this parameter, the data obtained have to be processed, since a poor seal of one cylinder also affects the data relating to the previous cylinder in the firing order, which has to perform compression work which is reduced by the leakage section of the following cylinder.

The leakage section and the consequent loss of compression have a more obvious effect on the resisting-torque curves of each cylinder at very low speeds since, at high speeds, if the leakage flow is not great, its effect on the filling and therefore the operation of the engine M is not apparent. The processing of the data relating to the resisting-torque curves may be dangerous if sufficient samples are not acquired on various switchings-off in similar thermal conditions.

The resisting torque of the engine M is in fact particularly sensitive to the temperature of the lubricant (and hence of the engine block) so that comparison of the data acquired during switchings-off at different temperatures would lead to incorrect conclusions regarding condition of the engine M.

It is therefore necessary for the acquisition of the data relating to groups of switchings-off to be made conditional upon the thermal state of the engine M, by enablement of the measurements on the basis of the indication of the coolant-temperature sensor.

Vehicle Preparation and Tests Carried Out

Experimental validation of the method was carried out on a LANCIA DEDRA 2000 i.e. (8 valves) with a catalyst (IAW injection system manufactured by MAGNETI MARELLI S.p.A.) by acquisition of the electromagnetic top-dead-centre sensor TDC and timing signals necessary to take measurements by the dynamic torque-measurement method, at the normal running temperature of the coolant (88° C.–92° C.) for homogeneity of the data, the signal for starting the acquisition being supplied when the engine M is switched off (voltage on pin 20 of the IAW control unit at 0 volts).

The 900–350 rpm range was thus examined by the consideration of several measurements taken in the same conditions so as to make the torque curves of each cylinder denser. In order to exclude the measurement noise generated by the reaction torque on the mounting blocks of the engine M, the calculations were carried out on the data acquired in the 600–350 rpm range.

Leakages were simulated by the mounting on one cylinder of a plug with a hole the diameter of which was increased gradually so as to increase the leakage; measurements were then taken in the absence of leakage and with zero compression, by removing the plug from one of the cylinders completely.

Results Obtained

The idling-speed torque curves were measured in the absence of leakages and with a calibrated leakage equivalent to sticking of 0.02 mm. It was possible to note a clear difference between the torque curve of the cylinder subjected to leakage and the curves of the other cylinders and that this difference diverged when the leakage increased.

The tests carried out showed that it was possible to determine by analysis, by the dynamic torque-measurement method, a factor indicative of the compression leakages as a function of the leakage section which, in its most convenient experimental form, supplied an indication relating to each cylinder in comparison with the others.

This indication enabled a decision to act on the engine M to be taken since an engine M with identical leakages in all of the cylinders is very imp robable and would in any case be shown by the analysis by the conventional dynamic torque-measurement method (measurement of the mean resisting torque).

The measurements taken showed that it was possible to identify, in a repeatable manner, leakage sections equivalent to sticking of a valve of the order of 0.01 mm.

Measurements to be made (all by means of the connector of the control unit ECU):

| | |
|---|---|
| TDC | instantaneous speed (4 samples per engine cycle), |
| phase | synchronism with known cylinder, |
| coolant | measurement enabled if 88° C. < Tc (coolant temperature) <92° C. |
| pin 20 | measurement enabled with voltage V = 0 volts. |

Processing of Data Acquired

1. Measurement of 30 switchings-off of the engine M from 900 rpm to 0, always in the same measurement conditions:

Tc between 88° C. and 92° C.

ENGINE SPEED about 900 rpm.

2. Application of the dynamic torque-measurement method for calculation of the torque. All of the values within the range between 500 and 200 rpm were stored in four different temporary files (archives) per cylinder:

| |
|---|
| cylinder 1 –> file: 0.TMP |
| cylinder 3 –> file: 1.TMP |
| cylinder 4 –> file: 2.TMP |
| cylinder 2 –> file: 3.TMP |

3. Calculation of the mean resisting torque value per cylinder (Vmed). The data stored in the four "*.TMP" files were used:

$$VmedX = \frac{\text{sum of values read from the file X.TMP}}{\text{number of data present in the file X.TMP}}$$

where $X$ = [0 for cyl. 1], [1 for cyl. 3], [2 for cyl. 4], [3 for cyl. 2].

4. Calculation of the mean value (Valmed) of the Vmeds of the 4 cylinders, which represents the threshold to be considered in order to identify the anomalous cylinder:

$$sumved = Vmed0 + Vmed1 + Vmed2 + Vmed3$$

$$Valmed = \frac{sumved}{4}$$

5. Identification of the cylinder with compression leakage. With the exclusion of one cylinder at a time, the mean values of the 3 remaining Vmeds was calculated and compared with Valmed. A coefficient (coefx) which enabled a compression leakage to be detected in cylinder X was thus obtained:

$$coefX = \frac{sumved - VmedX}{3} \times \frac{1}{Valmed}$$

where $X$ = [0 for cyl. 1], [1 for cyl. 3], [2 for cyl. 4], [3 for cyl. 2].

Cylinder X was affected by compression leakage if:

$$coefX<0.99$$

Otherwise, if:

$$coefx \geqq 0.99$$

no anomaly was detected in cylinder X.

Application of the Method to the Test Measurements

Measurements on LANCIA DEDRA 2.0 i.e.

1. Measurements during switching-off with the engine unchanged from 900 rpm to 0:

| Valmed = −2.231306 | | |
|---|---|---|
| | Vmed | coef |
| CYL.1 | −2.238839 | 0.998 |
| CYL.3 | −2.228468 | 1.000 |
| CYL.4 | −2.206959 | 1.003 |
| CYL.2 | −2.250959 | 0.997 |

2. Measurements during switching-off with a plug with a hole in cyl.1:

| Valmed = −2.362913 | | | |
|---|---|---|---|
| | Vmed | coef | |
| CYL.1 | −2.617024 | 0.964 | (*) < −detected |
| CYL.3 | −2.328510 | 1.004 | |
| CYL.4 | −2.234702 | 1.018 | |
| CYL.2 | −2.271419 | 1.012 | |

3. Measurements during switching-off with a plug with a hole in cyl.3:

| Valmed = −2.338006 | | | |
|---|---|---|---|
| | Vmed | coef | |
| CYL.1 | −2.254583 | 1.011 | |
| CYL.3 | −2.589498 | 0.964 | (*) < −detected |
| CYL.4 | −2.221982 | 1.016 | |
| CYL.2 | −2.285959 | 1.007 | |

Measurements on LANCIA DEDRA 2.0 i.e. TURBO

1. Measurements during switching-off with engine unchanged from 900 rpm to 0:

| Valmed = −2.201725 | | | |
|---|---|---|---|
| | Vmed | coef | |
| CYL.1 | −2.139604 | 1.009 | |
| CYL.3 | −2.316294 | 0.983 | (*) < −detected |
| CYL.4 | −2.103809 | 1.015 | |
| CYL.2 | −2.247192 | 0.993 | |

2. Measurements during switching-off with a plug with a hole in cyl.3:

| Valmed = −2.289621 | | | |
|---|---|---|---|
| | Vmed | coef | |
| CYL.1 | −2.160205 | 1.019 | |
| CYL.3 | −2.589622 | 0.956 | (*) < −detected |
| CYL.4 | −2.126348 | 1.024 | |
| CYL.2 | −2.282310 | 1.001 | |

Test Results

FIG. 3 shows the curves of probe signals measuring the air/fuel ratio in the various cylinders used purely experimentally in order to check the correct operation of the method according to the invention as the procedure for calibrating the offset at idling speed progressed.

From the initial value (step 0, performed with two calibrated injectors with flow-rates equal to the nominal value (cyl. 1 and 4) and two injectors calibrated at −10% relative to the nominal flow-rate value (cyl. 2 and 3)) the four admission values were reduced symmetrically in order to have conditions of greater sensitivity to subsequent changes in the air/fuel ratio.

It should be noted that the calibration tends in any case to cause the air/fuel ratio values to converge in order to bring them to levels which tend towards the stoichiometric ratio with a spread between the cylinders no greater than one air/fuel point, whatever the spread of the initial set of injectors I.

FIG. 2 shows the following three quantities sampled over 35 engine cycles:

the instantaneous torque, cylinder by cylinder the injection times TJ assigned to each cylinder the instantaneous rate of rotation rpm of the engine M relating to the last calibration step.

Naturally, the principle of the invention remaining the same, the details of construction and forms of embodiment may be varied widely with respect to those described and illustrated, without thereby departing from the scope of the present invention as defined in the annexed claims.

What is claimed is:

1. A method of calibrating an injection system associated with an internal-combustion engine (M) controlled by an electronic processing unit (ECU), the injection system comprising a plurality of injectors (I) for admitting fuel to a plurality of cylinders of the engine (M), the method enabling the processing unit (ECU) to operate the injectors (I) in a manner such as to admit a precisely known quantity of fuel to each cylinder in the presence of injectors (I) having different flow-rates, the method comprising the steps of:

operating the engine (M) with the injectors (I) operated with identical open times, detecting a torque pulse supplied by each cylinder of the engine (M), determining the flow-rate of each injector (I) on the basis of the torque pulse detected, storing data relating to the flow-rates of the injectors (I) in a memory of the processing unit (ECU), using the data stored relating to the flow-rates of the injectors (I) in the course of the normal operation of the engine (M) as factors for correcting the open times of the injectors (I) so as to compensate for the different flow-rates of the injectors (I);

characterised in that it also comprises the step of measuring the compression seal of each cylinder and compensating the torque pulse measurements on the basis of the determined compression seals;

the compression seal of each cylinder being determined by calculating the resisting torque value for each cylinder as the average of a plurality of resisting-torque valves determined for each cylinder after the engine (M) has been switched-off and while the engine speed and the engine temperature are comprised within respective predetermined ranges.

2. A method according to claim 1, characterized in that the resisting torque for each cylinder is measured in a release stage, which follows a step in which the engine (M) is accelerated and in which the engine (M) decelerates in the absence of combustion.

3. A method according to claim 1, characterized in that the flow-rate of each injector (I) is measured by increasing the air/fuel ratio in each cylinder in successive steps and detecting the first misfire.

4. A method according to claim 1, characterized in that the data relating to the flow-rates are stored in a non-volatile read and write memory associated with the processing unit (ECU).

5. A method according to claim 1, characterized in that the method is carried out with the advance, the air-valve adjustment, and the adjustment relative to a lambda probe remaining constant.

6. A method according to claim 1, characterized in that the measurements are repeated if an electrical user is switched on or off in the course of the measurements.

7. An injection system for an internal-combustion engine (M) comprising an electronic control unit (ECU) configured for implementing a calibration method according to claim 1.

8. A method according to claim 1, characterized in that the torque measurements are made by the processing of a signal indicative of the angular velocity of a drive shaft of the engine (M).

9. A method according to claim 8, characterized in that the torque measurements are carried out by analysis of the variations of the angular velocity of the engine shaft.

10. A method according to claim 8, characterized in that the signal indicative of the angular velocity of the said shaft is a phonic-wheel signal (RF).

11. A method according to claim 1, characterized in that: the step of operating the engine (M) with the injectors (I) operated with identical open times comprises the steps of:

operating the engine (M) with the injectors (I) operated with long open times, operating the engine (M) with the injectors (I) operated with short open times, and the step of determining the flow-rate of each injector (I) on the basis of the torque-pulse detected, comprises the steps of:

measuring the quantity of fuel admitted by each injector (I) for the long open times, and measuring the quantity of fuel admitted by each injector (I) for the short open times.

12. A method according to claim 11, characterized in that:

the step of operating the engine (M) with the injectors (I) operated with long open times comprises the step of accelerating the engine (M) without load with maximum opening of a valve disposed in the intake ducts, and the step of operating the engine (M) with the injectors (I) operated with short open times comprises the step of operating the engine (M) without load at idling speed.

13. A method according to claim 11, characterized in that the step of using the data stored relating to the flow-rates comprises the step of approximating the quantity of fuel admitted by each injector (I) in dependence on the open time by a straight line determined in dependence on the quantity of fuel admitted measured for the long open times and the quantity of fuel admitted measured for the short open times.

* * * * *